United States Patent
Hasan et al.

(10) Patent No.: US 12,403,802 B2
(45) Date of Patent: Sep. 2, 2025

(54) CAR SEAT BASE WITH INSTALLATION GUIDANCE AND LOCKING ANTI-REBOUNDING MECHANISM

(71) Applicant: BabyArk LTD, Hevel Modiln Industrial Park (IL)

(72) Inventors: Anan Hasan, Julis (IL); Shy Mindel, Hod-HaSharon (IL); Yury Antonov, Netanya (IL)

(73) Assignee: BabyArk LTD, Hevel Modiln Industrial Park (IL)

( * ) Notice: Subject to any disclaimer, the term of this patent is extended or adjusted under 35 U.S.C. 154(b) by 116 days.

(21) Appl. No.: 17/774,172

(22) PCT Filed: Nov. 4, 2020

(86) PCT No.: PCT/IL2020/051142
§ 371 (c)(1),
(2) Date: May 4, 2022

(87) PCT Pub. No.: WO2021/090313
PCT Pub. Date: May 14, 2021

(65) Prior Publication Data
US 2022/0363168 A1  Nov. 17, 2022

Related U.S. Application Data

(60) Provisional application No. 62/930,012, filed on Nov. 4, 2019.

(51) Int. Cl.
*B60N 2/02* (2006.01)
*B60N 2/28* (2006.01)
(Continued)

(52) U.S. Cl.
CPC ........... *B60N 2/2824* (2013.01); *B60N 2/286* (2013.01); *B60N 2/2887* (2013.01);
(Continued)

(58) Field of Classification Search
CPC .... B60N 2/2821; B60N 2/2824; B60N 2/286; B60N 2/2887; B60N 2/002; B60N 2/266–273; B60R 21/01556
See application file for complete search history.

(56) References Cited

U.S. PATENT DOCUMENTS

| 4,512,604 A | 4/1985 | Maeda et al. |
| D323,432 S | 1/1992 | Morton |
| | | (Continued) |

FOREIGN PATENT DOCUMENTS

| CN | 1976830 | 6/2007 |
| CN | 101786431 | 7/2010 |
| | (Continued) | |

OTHER PUBLICATIONS

Supplementary European Search Report and the European Search Opinion Dated May 15, 2024 From the European Patent Office Re. Application No. 20885873.8. (13 Pages).
(Continued)

*Primary Examiner* — Syed A Islam

(57) ABSTRACT

A system for guiding installation of car seat base and a corresponding car seat includes sensors mounted on the car seat base for detecting a progress in a plurality of sequential installation steps. The installation steps are required for installing the car seat base and the corresponding car seat on a vehicle seat. The car seat base further includes light emitting elements arranged at various locations on the car seat base, each location corresponding to one of the installation steps. A processor is adapted to execute code instructions for, in response to outputs of the sensors, identifying completion of a current installation step. The processor is further adapted to instruct a suitable light emitting element to indicate a location corresponding to an installation step following the current installation step. An anti-rebound
(Continued)

device includes a spring or piston that adaptively adjusts in response to an impact and a locking mechanism.

9 Claims, 26 Drawing Sheets

(51) Int. Cl.
  *B60R 21/015* (2006.01)
  *B60N 2/00* (2006.01)
  *B60N 2/26* (2006.01)
(52) U.S. Cl.
  CPC ........ *B60R 21/01556* (2014.10); *B60N 2/002* (2013.01); *B60N 2/266* (2023.08)

(56) References Cited

U.S. PATENT DOCUMENTS

| | | | |
|---|---|---|---|
| D339,477 S | 9/1993 | Kain | |
| D366,965 S | 2/1996 | Meeker et al. | |
| D373,028 S | 8/1996 | Kain | |
| D374,558 S | 10/1996 | Kain | |
| D383,912 S | 9/1997 | Meeker et al. | |
| 5,685,603 A | 11/1997 | Lane, Jr. | |
| 5,943,295 A | 8/1999 | Varga et al. | |
| 6,012,007 A | 1/2000 | Fortune et al. | |
| D419,786 S | 2/2000 | Kain | |
| 6,206,470 B1 | 3/2001 | Baloga et al. | |
| D450,935 S | 11/2001 | Dranschak et al. | |
| 6,393,348 B1 | 5/2002 | Ziegler et al. | |
| 6,609,054 B2 | 8/2003 | Wallace | |
| D484,941 S | 1/2004 | Johnson | |
| D487,640 S | 3/2004 | Chen | |
| 6,808,200 B2 | 10/2004 | Drobny et al. | |
| 6,922,147 B1 | 7/2005 | Viksins et al. | |
| 7,024,294 B2 | 4/2006 | Sullivan et al. | |
| D524,560 S | 7/2006 | Berhow et al. | |
| 7,288,009 B2* | 10/2007 | Lawrence ............ B60N 2/2812 439/824 |
| D572,027 S | 7/2008 | Hui | |
| 7,439,866 B2* | 10/2008 | Wallner ............... B60N 2/2806 180/271 |
| 7,523,679 B2 | 4/2009 | Hawes et al. | |
| D604,054 S | 11/2009 | Biaud | |
| D621,171 S | 8/2010 | Xu | |
| D629,218 S | 12/2010 | Li | |
| D629,219 S | 12/2010 | Xu et al. | |
| D629,220 S | 12/2010 | Xu et al. | |
| 8,366,146 B2 | 2/2013 | Yamaki et al. | |
| D680,764 S | 4/2013 | Chen | |
| D683,974 S | 6/2013 | Leys et al. | |
| D697,323 S | 1/2014 | Williams et al. | |
| D702,052 S | 4/2014 | Wiegmann et al. | |
| 8,816,845 B2 | 8/2014 | Hoover et al. | |
| D737,061 S | 8/2015 | Daley et al. | |
| 9,132,754 B2 | 9/2015 | Mindel et al. | |
| D746,072 S | 12/2015 | Haley | |
| 9,266,535 B2 | 2/2016 | Schoenberg et al. | |
| D764,817 S | 8/2016 | Pos | |
| D771,987 S | 11/2016 | Daley et al. | |
| D778,627 S | 2/2017 | Stroikov | |
| D824,182 S | 7/2018 | Williams et al. | |
| 10,081,274 B2 | 9/2018 | Frank | |
| D841,346 S | 2/2019 | Huntley et al. | |
| D851,948 S | 6/2019 | Imrich | |
| D859,861 S | 9/2019 | Kapanzhi | |
| 10,723,245 B2* | 7/2020 | Anderson ............. B60N 2/289 |
| 11,560,073 B2 | 1/2023 | Pos | |
| 11,964,623 B2 | 4/2024 | Hasan | |
| 2002/0175544 A1 | 11/2002 | Goor | |
| 2003/0155753 A1 | 8/2003 | Breed | |
| 2004/0113797 A1 | 6/2004 | Osborne | |
| 2005/0248136 A1 | 11/2005 | Breed et al. | |
| 2006/0273640 A1* | 12/2006 | Kassai ................. B60N 2/2821 297/256.16 |
| 2009/0152913 A1 | 6/2009 | Amesar et al. | |
| 2010/0253498 A1 | 10/2010 | Rork | |
| 2012/0074758 A1 | 3/2012 | Gates | |
| 2013/0088057 A1* | 4/2013 | Szakelyhidi ......... B60N 2/0244 297/250.1 |
| 2014/0239684 A1 | 8/2014 | Mindel | |
| 2014/0253313 A1 | 9/2014 | Schoenberg | |
| 2014/0300155 A1 | 10/2014 | Lehman | |
| 2014/0354021 A1 | 12/2014 | Sedlack | |
| 2017/0140634 A1 | 5/2017 | Mindel | |
| 2018/0099592 A1 | 4/2018 | Curry, V | |
| 2018/0232638 A1 | 8/2018 | Lin et al. | |
| 2018/0354443 A1 | 12/2018 | Ebrahimi et al. | |
| 2019/0176739 A1 | 6/2019 | Song | |
| 2019/0193590 A1 | 6/2019 | Labombarda et al. | |
| 2019/0251820 A1 | 8/2019 | Friedman | |
| 2021/0078461 A1* | 3/2021 | Ma ....................... B60N 2/2821 |
| 2022/0371483 A1 | 11/2022 | Hasan | |
| 2022/0402452 A1 | 12/2022 | Hasan | |

FOREIGN PATENT DOCUMENTS

| | | |
|---|---|---|
| CN | 102015364 | 4/2011 |
| CN | 102189946 | 9/2011 |
| CN | 103042954 | 4/2013 |
| CN | 103879316 | 6/2014 |
| CN | 104024042 | 9/2014 |
| CN | 204327674 | 5/2015 |
| CN | 105620321 | 6/2016 |
| CN | 106627285 | 5/2017 |
| CN | 107662527 | 2/2018 |
| CN | 208498316 | 2/2019 |
| CN | 208576460 | 3/2019 |
| CN | 110116661 | 8/2019 |
| CN | 110126687 | 8/2019 |
| DE | 4446595 | 10/1995 |
| DE | 102008027829 | 12/2009 |
| DE | 102017126431 | 5/2019 |
| EP | 2269861 | 1/2011 |
| EP | 2746097 | 6/2014 |
| GB | 2490414 | 10/2012 |
| JP | 2009-274492 | 11/2009 |
| JP | 2010-284992 | 12/2010 |
| WO | WO 2013/046200 | 4/2013 |
| WO | WO 2017/029272 | 2/2017 |
| WO | WO 2019/091916 | 5/2019 |
| WO | WO 2021/090313 | 5/2021 |
| WO | WO 2021/090315 | 5/2021 |
| WO | WO 2021/090316 | 5/2021 |
| WO | WO 2021/090318 | 5/2021 |
| WO | WO 2018/054249 | 8/2021 |

OTHER PUBLICATIONS

Notification of Office Action and Search Report Dated Jan. 22, 2024 From the State Intellectual Property Office of the People's Republic of China Re. Application No. 202080091573.3 and its Machine Translation of Office Action Into English as well as an English summary. ( 17 Pages).
International Preliminary Report on Patentability Dated May 19, 2022 From the International Bureau of WIPO Re. Application No. PCT/IL2020/051142. (10 Pages).
International Preliminary Report on Patentability Dated May 19, 2022 From the International Bureau of WIPO Re. Application No. PCT/IL2020/051146. (8 Pages).
International Preliminary Report on Patentability Dated May 19, 2022 From the International Bureau of WIPO Re. Application No. PCT/IL2020/051147. (10 Pages).
International Preliminary Report on Patentability Dated May 19, 2022 From the International Bureau of WIPO Re. Application No. PCT/IL2020/051149. (10 Pages).
International Search Report and the Written Opinion Dated Feb. 7, 2021 From the International Searching Authority Re. Application No. PCT/IL2020/051146. (10 Pages).

(56) References Cited

OTHER PUBLICATIONS

International Search Report and the Written Opinion Dated Apr. 12, 2021 From the International Searching Authority Re. Application No. PCT/IL2020/051142. (16 Pages).
International Search Report and the Written Opinion Dated Feb. 17, 2021 From the International Searching Authority Re. Application No. PCT/IL2020/051149. (17 Pages).
International Search Report and the Written Opinion Dated Mar. 25, 2021 From the International Searching Authority Re. Application No. PCT/IL2020/051147. (11 Pages).
Invitation to Pay Additional Fees and Communication Relating to the Results of the Partial International Search Dated Feb. 23, 2021 From the International Searching Authority Re. Application No. PCT/IL2020/051142. (4 Pages).
Notice of Allowability Dated Jul. 8, 2021 from the US Patent and Trademark Office Re. U.S. Appl. No. 29/713,766. (4 pages).
Notice of Allowance Dated Oct. 22, 2021 from the US Patent and Trademark Office Rc. U.S. Appl. No. 29/712,626. (27 pages).
Notice of Allowance Dated Apr. 23, 2021 from the US Patent and Trademark Office Re. U.S. Appl. No. 29/716,766. (19 pages).
Notification of Office Action Dated Jul. 6, 2020 From the China National Intellectual Property Administration Re. Application No. 201930604505.2. (1 Page).
Notification of Office Action Dated Apr. 13, 2020 From the China National Intellectual Property Administration Re. Application No. 201930604505.2. (2 Pages).
Office Action Dated Oct. 26, 2020 From the Israel Patent Office Re. Application No. 65010. (2 Pages).
Office Action Dated Oct. 29, 2020 From the Israel Patent Office Re. Application No. 65009. (2 Pages).
Technical Requirement Dated Sep. 7, 2020 From the Servico Publico Federal, Ministerio da Economia, Instituto Nacional da Propriedade Industrial do Brasil Re. Application No. BR302020002169-0 and Its Translation Into English. (16 Pages).
BeSafe "BeSafe iZi Modular i-Size Installation", BeSafe—Scandinavian Safety, Screen Capture From YouTube Video Clip, 1 P., Feb. 9, 2016.
BeSafe "iZi Modular™ i-Size—User Manual", BeSafe® Scandinavian Safety, UN Regulation No. R129, p. 1-98, May 18, 2017.
BeSafe "SIP+—Additional Side Impact Protection", BeSafe® Scandinavian Safety, p. 1-4, 2019.
BeSafe "Toddler Car Seat—iZi Modular i-Size Concept", BeSafe® Scandinavian Safety, Product Description, p. 1-7, 2019.
Britax "Britax Roemer BABY-SAFE i-SIZE Review", Pushchair Expert, Product Description, p. 1-10, Dec. 21, 2016.
Jollyroom "CYBEX Sirona M2 i-Size Instructionvideo", Screen Capture From YouTube Video Clip, 1 P., Mar. 23, 2017.
Maxi-Cosi "Maxi-Cosi—How to Install the AxissFix Car Seat in Your Car", Screen Capture From YouTube Video Clip, 1 P., Dec. 12, 2014.
Maxi-Cosi "The New Pebble Plus", Screen Capture From YouTube Video Clip, 1 P., Oct. 10, 2014.
Smyths Toys Superstore "Smyth Toys—Doona ISOfix Base Black", Screen Capture From YouTube Video Clip, 1 P., Apr. 14, 2017.
Supplementary European Search Report and the European Search Opinion Dated Nov. 15, 2023 From the European Patent Office Re. Application No. 20885576.7. (10 Pages).
Supplementary European Search Report and the European Search Opinion Dated Dec. 13, 2023 From the European Patent Office Re. Application No. 20884278.1. (8 Pages).
Official Action Dated Jun. 1, 2023 from the US Patent and Trademark Office Re. U.S. Appl. No. 17/774,153. (22 pages).
Supplementary Partial European Search Report and the European Provisional Opinion Dated Dec. 5, 2023 From the European Patent Office Re. Application No. 20885873.8. (12 Pages).
Restriction Official Action Dated Apr. 26, 2024 from the US Patent and Trademark Office Re. U.S. Appl. No. 17/774,181. (6 pages).
Notice of Allowance Dated Nov. 20, 2023 from the US Patent and Trademark Office Re. U.S. Appl. No. 17/774,153. (3 pages).
Official Action Dated Nov. 16, 2023 from the US Patent and Trademark Office Re. U.S. Appl. No. 17/774,176. (27 pages).
Supplementary European Search Report and the European Search Opinion Dated Nov. 17, 2023 From the European Patent Office Re. Application No. 20885648.4. (7 Pages).
Notification of Office Action and Search Report Dated Feb. 27, 2024 From the State Intellectual Property Office of the People's Republic of China Re. Application No. 202080091585.6 and its Machine Translation Into English. (27 Pages).
Machine Translation Dated Feb. 22, 2024 of Notification of Office Action and Search Report Dated Feb. 8, 2024 From the National Intellectual Property Administration of the People's Republic of China Re. Application No. 202080091578.6. (10 Pages).
Notification of Office Action and Search Report Dated Feb. 8, 2024 From the National Intellectual Property Administration of the People's Republic of China Re. Application No. 202080091578.6. (9 Pages).
English Summary Dated Feb. 27, 2024 of Notification of Office Action Dated Feb. 8, 2024 From the National Intellectual Property Administration of the People's Republic of China Re. Application No. 202080091578.6. (2 Pages).
Notification of Office Action Dated Oct. 14, 2024 From the State Intellectual Property Office of the People's Republic of China Re. Application No. 202080091578.6 and its Machine Translation together with an Engluish Summary. (17 Pages).
Official Action Dated Oct. 17, 2024 from the US Patent and Trademark Office Re. U.S. Appl. No. 18/610,311. (26 pages).
Official Action Dated Oct. 1, 2024 from the US Patent and Trademark Office Re. U.S. Appl. No. 17/774,181. (35 pages).
Decision of Rejction Dated Feb. 27, 2025 From the State Intellectual Property Office of the People's Republic of China Re. Application No. 202080091578.6 and its Machine Translation into English. (20 Pages).
Notification of Office Action Dated Jul. 16, 2024 From the State Intellectual Property Office of the People's Republic of China Re. Application No. 202080091585.6. (4 Pages).
Notice of Allowance Dated Jun. 21, 2024 from the US Patent and Trademark Office Re. U.S. Appl. No. 17/774,176. (29 pages).
Translation and Summary Dated Jul. 29, 2024 of Notification of Office Action Dated Jul. 16, 2024 From the State Intellectual Property Office of the People's Republic of China Re. Application No. 202080091585.6. (4 Pages).

\* cited by examiner

FIG. 7A
240
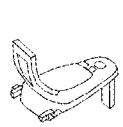   
| ISOFIX | Rebounder | Leg | Seat |
| Bucle |
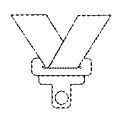

Piston pushes the rebounder against the seat

Rebounder is locked against the seat, preventing the base from moving

Isofix lower latch connecting the base to the vehicle

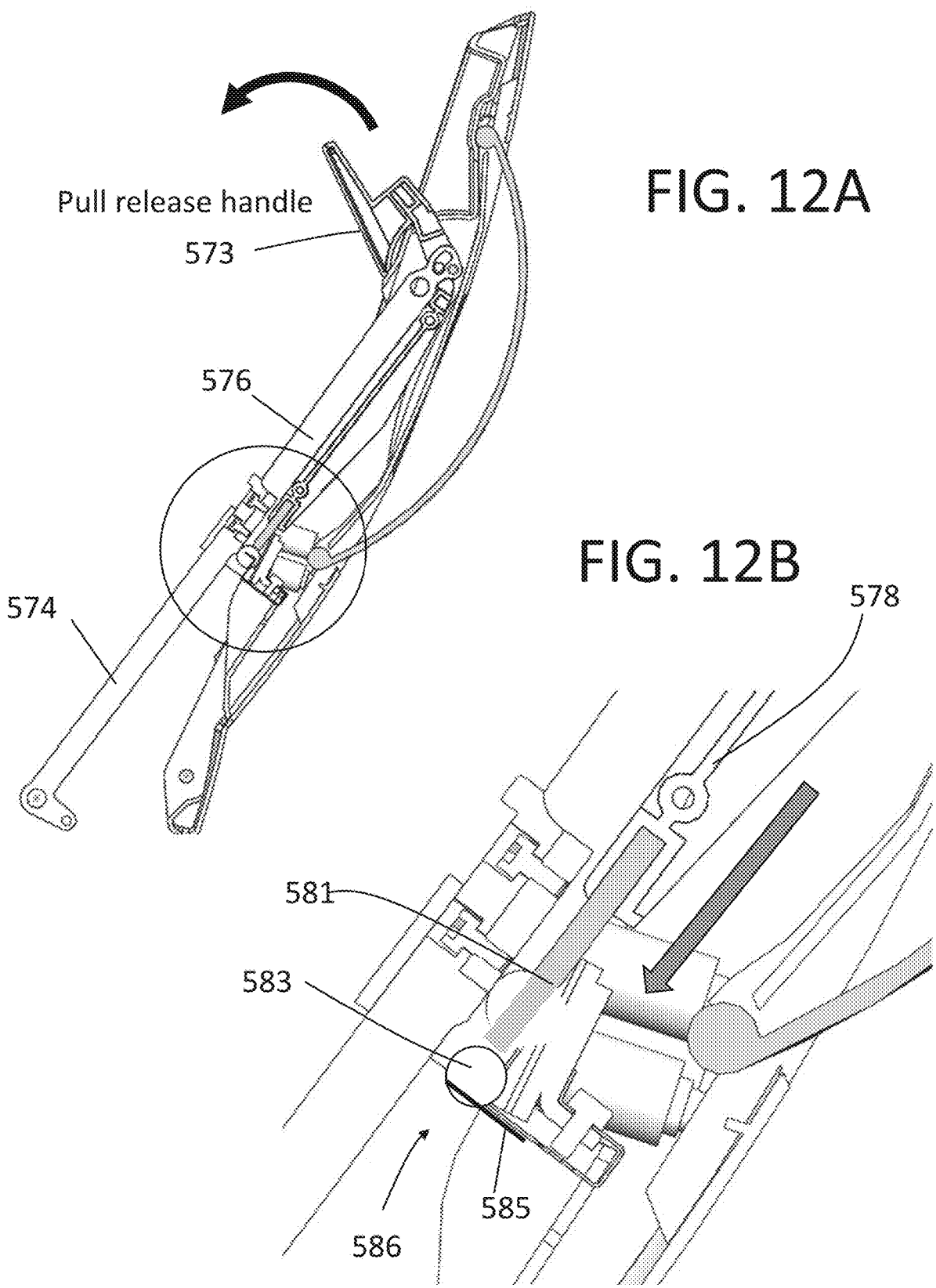

CAR SEAT BASE WITH INSTALLATION GUIDANCE AND LOCKING ANTI-REBOUNDING MECHANISM

RELATED APPLICATIONS

This Application is a National Phase of PCT Patent Application No. PCT/IL2020/051142 having International filing date of Nov. 4, 2020, which claims the benefit of priority under 35 USC § 119 (e) of U.S. Provisional Patent Application No. 62/930,012, filed on Nov. 4, 2019. The contents of the above applications are all incorporated by reference as if fully set forth herein in their entirety.

FIELD AND BACKGROUND OF THE INVENTION

The present invention, in some embodiments thereof, relates to a base for a car seat for a vehicle, and more particularly, but not exclusively, to mechanisms for improving ease of installation of a car seat base. The present invention also relates to an anti-rebounding mechanism for a car seat base with a locking feature, and to a mechanism for improving ease of installation of such an anti-rebounding mechanism.

Car seats have a high occurrence of misuse due to installation complexity. This is because car seats are highly mechanical products that need to be connected to a car in various positions, comply with various standards, adjust to different car seat designs and be installed in accordance with a child's size. The positions may include: rear-facing attached with seat belt; rear facing attached with Isofix latch; front-facing attached with seat belt; front facing attached with Isofix latch; a combination thereof (seat belt and Isofix), installation with or without a separate base; installation with or without a top tether; and installation with or without a load-bearing leg. Due to the complexity and number of installation steps, many of the steps are not done correctly, putting a child at risk.

Existing car seats partially address these concerns by providing indications that certain installation steps have been performed correctly. For example, upon successful completion of an installation step for a car seat, the car seat may display a light signal. Alternatively, the car seat base may include an indicator that is partially colored red and partially colored green, and which is mechanically movable relative to a window. The red portion of the indicator may be visible through the window prior to completion of the installation step. Completion of the installation step may move the indicator such that the green portion is now visible through the window. Other indications include emitting an audible sound, such as a "click," when the step is completed.

Car seat bases may be attachable to a vehicle with one or more of two complementary processes. In one process, the car seat base may include a seat belt guide. The seat belt of the vehicle is guided through the guide and buckled, thus retaining the base against the vehicle seat. In a second process, connectors attached to the car seat base are attached to fittings built into the vehicle seat. This process is known as Isofix or LATCH, and has been standardized as International Safety Organization standard ISO 13216.

Car seats may also feature anti-rebounding devices. An anti-rebounding device is an element laying against the seat back cushion (near the baby's feet, in a rear-facing car seat) that minimizes the rebound during and after a crash. Rebound is movement after the initial crash. For rear-facing babies, since the head area of their car seat is typically not braced against anything, the rebound usually causes the car seat bounce up and back toward the vehicle seatback. The rebound forces can be severe enough to allow a rear-facing child to strike the vehicle seatback. An anti-rebound device may be a bar installed at the foot of the car seat or at the rear of the base that braces the car seat against the seat back.

An exemplary prior art car seat base is illustrated in FIG. 1. Car seat base 1 includes anti-rebounding device 2. The anti-rebounding device 2 is capable of being raised only to a fixed position. In order to allow the car seat base 1 to be installed in vehicle seats of different sizes, the anti-rebounding device 2 is laterally adjustable along arrow 3. Car seat base 1 also includes Isofix latches 4. In order to allow the car seat base 1 to be installed on vehicle seats with different sizes, the Isofix latches 4 are also laterally adjustable along arrow 5.

SUMMARY OF THE INVENTION

The above-described indications for installation steps provide guidance to the user only after an installation step has been completed. They do not provide a user any prospective guidance as to which steps to complete. Accordingly, a user must consult other sources of instruction, such as an installation manual or a sticker mounted on the car seat base. The use of an installation manual or sticker may cause unnecessary confusion and may promote installation errors in the event that the manual or sticker is not available (e.g., they were lost or defaced).

In addition, installation steps for car seat bases may proceed from an initial step of either buckling the base to the vehicle seat with a seat belt or attaching Isofix connectors to fittings installed on the vehicle. It would be desirable for subsequent installation steps to proceed intuitively and identically, whether proceeding from a buckling step or from an Isofix connection step.

In addition, it is desirable to provide a car seat base that is safe and intuitive to install, including an anti-rebound device that maintains its position regardless of the severity of an impact.

The disclosed embodiments provide a car seat base that exhibits numerous advantages, including those described above.

The disclosed embodiments of a car seat base provide automated guidance to a user regarding progress in installation of the car seat. This guidance takes the form of light indications in specific areas of the car seat base, a pattern of light indications at a centralized portion of the car seat base, and/or an indication on a mobile application on the user's mobile device, or on a vehicle screen, or any other mobile or screen option. Prior to completion of each installation step, a light indication is displayed in the specific area of the car seat base that needs to be installed, and visual feedback and real-time instructions are provided in the application. After the installation step is performed correctly, an assurance indication is shown to the user, both by a light signal on the base and through a message or other indication in the application.

In addition, the car seat base is installed in just four steps. These four steps are performed intuitively and with a minimum of adjustments by the user. In a first step, a user affixes the base to the vehicle, either through an Isofix system or a vehicle seat belt. Unlike the prior art car seat base depicted in FIG. 1, the car seat base is equipped with rigid Isofix latches, so that the user does not need to open the latches and adjust their lateral locations. The car seat base is equipped with a handle. When the user carries the base from the handle (for example, to its position on the vehicle seat), a load leg drops down from a folded position underneath the car seat base to an extended position. The load leg is equipped with an angle sensor that informs the user the angle of the leg in real time, and a telescopic extension for anchoring the load leg to the floor of the vehicle. Thus, when the user attaches the base to the vehicle, the leg is already dropped down.

In a second step, the user extends an anti-rebounding device. The anti-rebounding device is self-extracting and self-adjusting to the back of the vehicle seat. Unlike the prior art car seat base depicted in FIG. 1, the anti-rebound device need not be adjusted manually to meet the back of the vehicle seat.

In a third step, the user extends the telescopic extension of the load leg to the floor of the vehicle. In a fourth step, the user attaches the car seat to the car seat base.

It is not possible to attach the car seat to the car seat base unless the car seat base is properly connected to the vehicle and the rebounder is in position. Furthermore, aside from controlling the extension of the leg, the user has no discretion in locating components of the car seat base during the installation process. As a result, the car seat base is installed intuitively and safely.

According to a first aspect, a system for guiding installation of a car seat base and a corresponding car seat includes sensors mounted on the car seat base for detecting a progress of a user in a plurality of sequential installation steps. The installation steps are required for installing the car seat base and the corresponding car seat on a vehicle seat. The car seat base further includes light emitting elements arranged at various locations on the car seat base, each location corresponding to one of the plurality of installation steps. A processor is adapted to execute code instructions for, in response to outputs of at least one of the plurality of sensors, identifying completion of a current installation step of the plurality of installation steps. The processor is further adapted to execute code instructions for instructing a suitable light emitting element from the plurality of light emitting elements to indicate a location corresponding to an installation step following the current installation step.

Advantageously, the car seat base directs a user to perform each sequential installation step following completion of prior installation steps. A user need only pay attention to the light signals, in order to both verify that a prior installation step is successfully completed, and to determine which section of the car seat base to install next.

In another implementation according to the first aspect, a central light interface is comprised of light emitting elements arranged in a pattern. Each of the light emitting elements of the central light interface corresponding to one of the installation steps. For each of the installation steps, whenever a light emitting element indicates a location corresponding to an installation step, a corresponding light from the central light interface displays a first type of light signal. Whenever a sensor senses that said particular installation step is complete, the corresponding light displays a second light signal. Advantageously, the central light interface provides a user with visual indication when each installation step is complete, as well as indication of progress in the entire installation process, through display of the light emitting elements in the pattern. Thus, at each stage of the installation, a simple glance is sufficient to understand the installation status and its accuracy.

In another implementation according to the first aspect, upon detection of an error status by one of the sensors, one or more of the light emitting elements is configured to display an error light signal to instruct the user to rectify the error. Optionally, the error includes at least one of: (1) installation step not completed correctly or completed in the wrong sequence; (2) child not buckled; (3) one of the parts of the car seat base or car seat not properly connected; and (4) car seat no longer structurally safe due to accident impact. Advantageously, the car seat base thus detects errors and alerts the errors to users.

In another implementation according to the first aspect, a communication module is configured to wirelessly deliver information to a mobile device about a status of each of the installation steps and/or an alert status. Code instructions are embodied in a non-transitory medium stored on the mobile device. The code instructions are configured, upon receipt of a status of completion of each installation step, to display a pictorial representation of a progress of installation of the car seat base and instructions for performing a subsequent step of the sequential installation steps. Advantageously, the car seat base thus delivers guidance to the user even when the user is not physically observing the car seat base. In addition, the guidance provided through the mobile device may be more detailed than the guidance provided by the lights on the car seat base.

In another implementation according to the first aspect, the car seat base includes a speaker for delivering audible messages regarding a status of each of the installation steps and/or an alert status. Advantageously, the speaker provides an audible message that complements the visual messaging provided by the light emitting elements.

In another implementation according to the first aspect, the sensors include sensors for detecting one or more of: (1) leg angle of a telescopic load leg; (2) pressure on the telescopic load leg; (3) extension of the telescopic load leg; (4) whether an Isofix connector of the base is engaged with a corresponding child safety seat attachment point of the vehicle; (5) whether a seat belt is passed through a seat belt guide; (6) whether an anti-rebound device is in a folded position or an extended position; (7) orientation of car seat as front facing or rear facing; (8) whether a car seat belt buckle is engaged; (9) presence of a child in the car seat; (10) reclining angle of the car seat; (11) type of car seat connected to the base; (12) whether the child car seat was subjected to substantial forces and is not suitable for usage or installation; and (13) whether a power source for the car seat base has sufficient power. Advantageously, the car seat base may thus provide information and instruction regarding the outputs of each of these sensors.

In another implementation according to the first aspect, the car seat base further includes a frame, a load leg that is pivotable from a folded position beneath the frame to an extended position between the frame and a vehicle floor, and at least one handle or grip oriented on the frame to enable grasping of the frame. When the car seat base is grasped from the at least one handle or grip, the leg pivots into the extended position. The presence of the handle, grip area, or combination thereof, thus assists a user in placing the car seat base onto a seat of the vehicle while simultaneously ensuring that the leg is correctly placed.

In another implementation according to the first aspect, the at least one handle or grip is configured on at least one of (1) on an upper portion of the frame; (2) on a front portion of the frame; (3) in a rear portion of the frame; and (4) on two parallel side portions of the frame.

In another implementation according to the first aspect, a locking mechanism locks the leg into the extended position. Advantageously, the locking mechanism maintains the leg in the extended position and prevents accidental refolding of the leg into the folded position.

According to a second aspect, a car seat base includes a frame shaped to be mounted on a vehicle seat, and having distal and proximal ends. The car seat base has a release mechanism. A rod is mechanically connected to (1) a stopper preventing release of the release mechanism; (2) a belt pedal adapted to be located beneath a seat belt; and (3) two arms each having a connecting latch. A depression of the belt pedal by the seat belt when the seat belt is bucked to the vehicle, or a locking of the connectors to child safety seat attachment points of the vehicle seat, induces a mechanical retraction of the stopper, thereby allowing release of the release mechanism. Advantageously, the release mechanism thus is released in the same way, whether the car seat base is initially attached to the vehicle with a seatbelt or with an Isofix mechanism.

In another implementation according to the second aspect, the release mechanism includes a push button release mechanism, the stopper is a button stopper preventing depression of the push button, and the depression of the belt pedal or the locking of the connecting latches induces a mechanical retraction of the button stopper, thereby allowing depression of the push button.

In another implementation according to the second aspect, an anti-rebound device is fixedly connected to the distal end and releasably connected to the proximal end. The anti-rebound device is convertible between (1) a folded position wherein the anti-rebound device is parallel to the frame, and (2) an extended position wherein the anti-rebound device forms a wide angle with the frame and contacts a back rest of the vehicle seat, to thereby limit rebounding of the car seat base. The release mechanism releases the anti-rebound device from the folded position into the extended position. Optionally, the anti-rebound device is released automatically following the depression of the belt pedal or the locking of the connecting latches. Advantageously, the anti-rebound device is thus installed in an intuitive manner. In addition, it is possible to convert the anti-rebound device from the folded position to the extended position only after the car seat base has been properly attached to the vehicle seat, whether via the seat belt or via the Isofix connectors.

In another implementation according to the second aspect, the anti-rebound device is spring-loaded or piston-loaded and extends from the folded position into the extended position by expansion of the spring or extension of the piston. Advantageously, the spring or piston provide a compact, efficient mechanism for extension of the anti-rebound device.

In another implementation according to the second aspect, the anti-rebound device further comprises a locking mechanism configured to prevent a return of the anti-rebound device from the extended position to the folded position. The locking mechanism includes an upper lock arm having a tapered receptacle at a lower end of said upper lock arm. The tapered receptacle includes a wide end at a lower extent thereof, a narrow end at a higher extent thereof, and at least one angled surface. The tapered receptacle receives therein a lower lock arm configured to slide through the tapered receptacle and a roller held by a spring. When the anti-rebound device is in the extended position, retraction of the lower lock arm causes rotation of the roller toward the narrow end, whereby the spring forces the roller to contact the lower lock arm and at least one of the at least one angled surface, thereby locking the lower lock arm against the roller and the tapered receptacle. Advantageously, this locking mechanism is unidirectional, permitting opening of the anti-rebound device but not allowing closing of the anti-rebound device.

Optionally, the locking mechanism further includes a release pedal mechanically connected to an arm extending to the narrow end of the tapered receptacle. Depression of the release pedal causes the arm to displace the roller from the narrow end, thereby permitting retraction of the lower lock arm through the tapered receptacle. The arm may be oriented substantially parallel to the upper lock arm. Advantageously, the release pedal provides a compact and intuitive system for unlocking the locking mechanism and permitting return of the anti-rebound device to the folded position.

In another implementation according to the second aspect, each of the arms comprises a spring-loaded piston. A first pivot is configured between each of the arms and the rod. Attachment of the connecting latches to the child safety seat attachment points drives the spring-loaded piston forward, thereby pivoting the first pivot in a forward direction and causing corresponding rearward movement of the rod.

In another implementation according to the second aspect, the belt pedal is attached to the rod with a second pivot. An extension is underneath the belt pedal. Depression of the belt pedal by the seat belt drives the extension into the second pivot, thereby pivoting the second pivot in a forward direction and causing corresponding rearward movement of the rod.

In another implementation according to the second aspect, substantially identical rearward movement of the rod is caused by either buckling the seat belt or by attaching the connectors to the fittings. Advantageously, the push button release mechanism is thus released in an identical way, regardless of the method employed to attach the car seat base to a vehicle seat.

According to a third aspect, a car seat base includes an anti-rebound device. A spring or piston automatically extends the anti-rebound device and secures the anti-rebound device against a vehicle seat back rest. The spring or piston are configured to adaptively adjust their configuration so as to secure the car seat base from rebounding in response to an impact. Advantageously, the adaptive adjustment of the anti-rebound device ensures that the anti-rebound device remains in place, even if the base moves or shifts, for example, during an accident. In addition, the adaptive adjustment of the anti-rebound device fixes the car seat in place during an accident, thereby improving the safety of the car seat.

In another implementation according to the third aspect, the car seat base includes a proximal end and a distal end. The anti-rebound device is fixedly connected to the distal end and releasably connected to the proximal end. The anti-rebound device is convertible between a folded position wherein the anti-rebound device is parallel to the frame, and an extended position wherein the anti-rebound device forms a wide angle with the frame and contacts the back rest of the vehicle seat. A push button release mechanism, when depressed, releases the anti-rebound device from the folded position into the extended position. Advantageously, the anti-rebound device may be intuitively and easily installed by depression of the push button.

In another implementation according to the third aspect, the anti-rebound device further comprises a locking mechanism configured to prevent a return of the anti-rebound device from the extended position to the folded position. The locking mechanism includes an upper lock arm having a tapered receptacle at a lower end of said upper lock arm. The tapered receptacle includes a wide end at a lower extent thereof, a narrow end at a higher extent thereof, and at least one angled surface. The tapered receptacle receives therein a lower lock arm configured to slide through the tapered receptacle and a roller held by a spring. When the anti-rebound device is in the extended position, retraction of the lower lock arm causes rotation of the roller toward the narrow end, whereby the spring forces the roller to contact the lower lock arm and at least one of the at least one angled surface, thereby locking the lower lock arm against the roller and the tapered receptacle. Advantageously, this locking mechanism is unidirectional, permitting opening of the anti-rebound device but not allowing closing of the anti-rebound device.

Optionally, the locking mechanism further includes a release pedal mechanically connected to an arm extending to the narrow end of the tapered receptacle. Depression of the release pedal causes the arm to displace the roller from the narrow end, thereby permitting retraction of the lower lock arm through the tapered receptacle. The arm may be oriented substantially parallel to the upper lock arm. Advantageously, the release pedal provides a compact and intuitive system for unlocking the locking mechanism and permitting return of the anti-rebound device to the folded position.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 7A is a depiction of a third embodiment of a central light interface;

FIG. 12A is a side view of the locking mechanism, showing a release pedal in a depressed position;

FIG. 12B is a close up depiction of elements of the locking mechanism with the release pedal in the depressed position;

DESCRIPTION OF SPECIFIC EMBODIMENTS OF THE INVENTION

Figure 1:
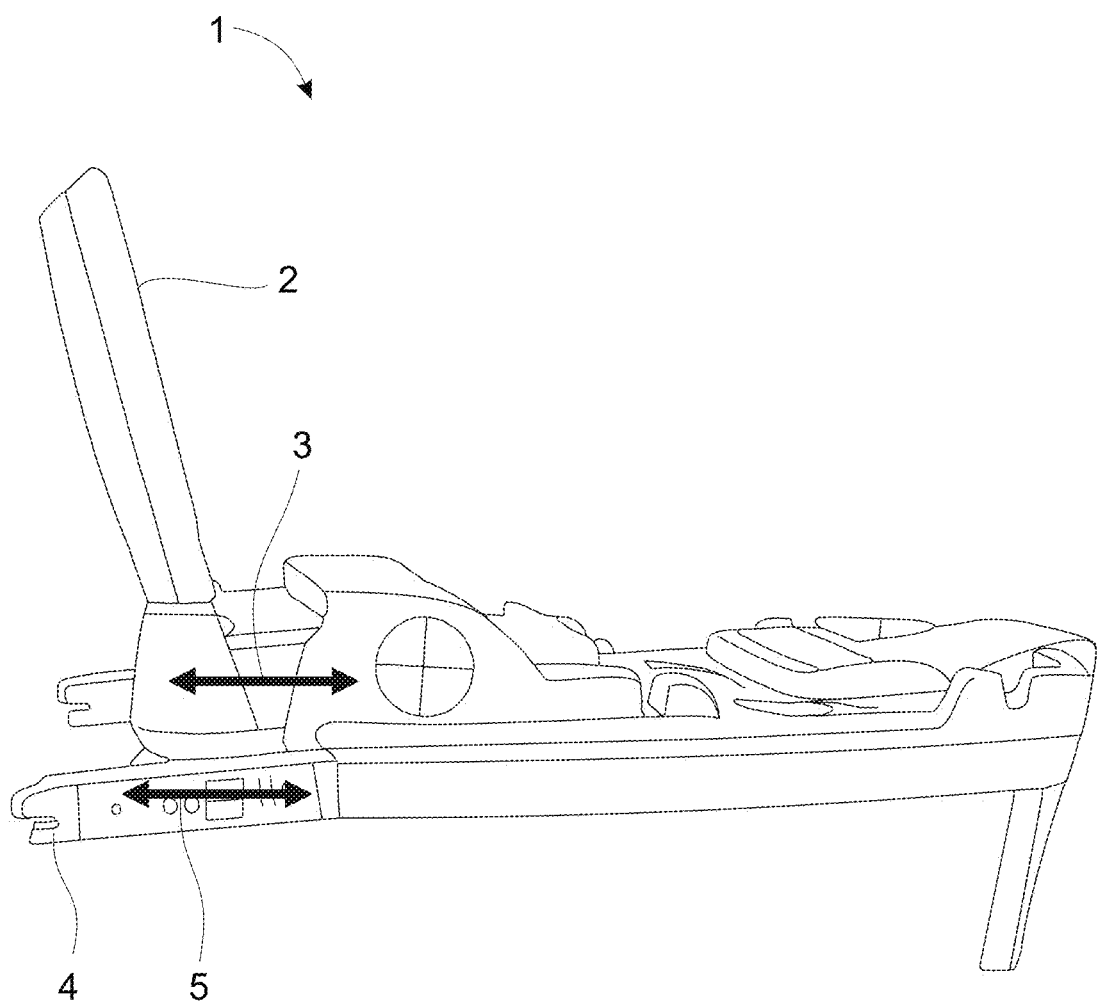
FIG. 1 is a side view of a prior art car seat base.

The present invention, in some embodiments thereof, relates to a base for a car seat for a vehicle, and more particularly, but not exclusively, to mechanisms for improving ease of installation of a car seat base. The present invention also relates to an anti-rebounding mechanism for a car seat base and to a mechanism for improving ease of installation of such an anti-rebounding mechanism.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
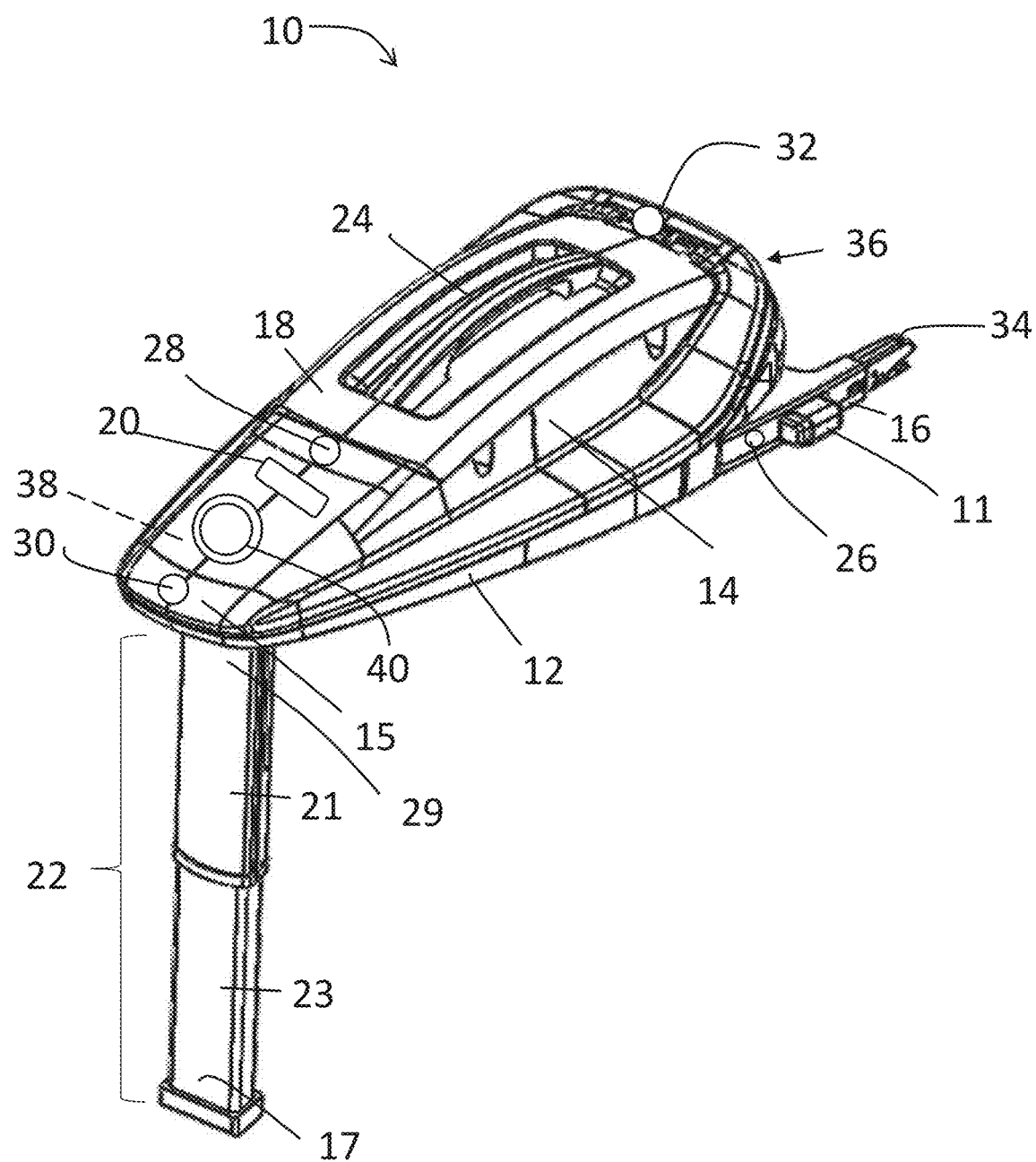
FIG. 2 is a left perspective view of a car seat base with an anti-rebound device in a folded position, according to embodiments of the invention.
Figure 3:
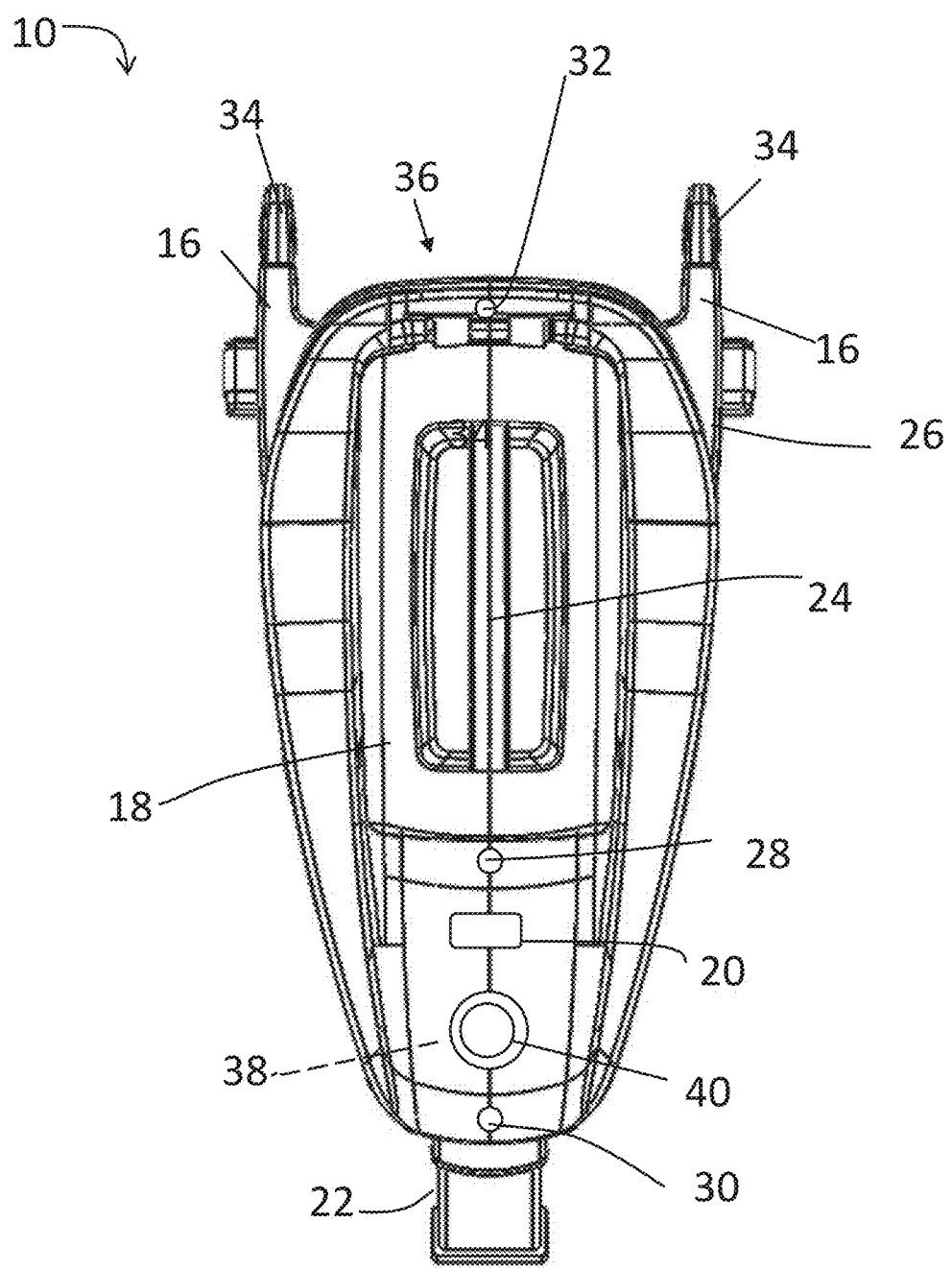
FIG. 3 is a top view of the car seat base of FIG. 2, according to embodiments of the invention.
Figure 4:
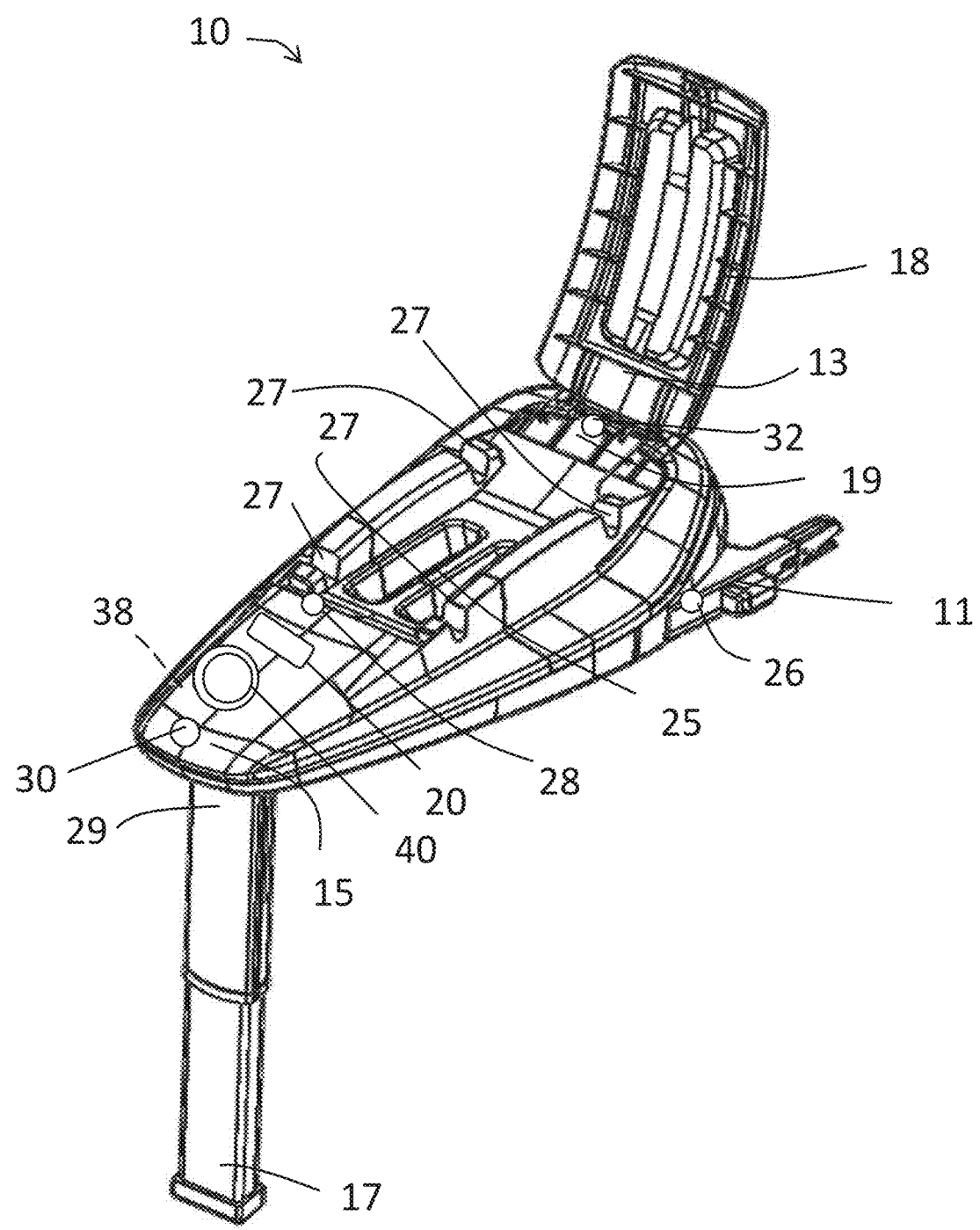
FIG. 4 is a left perspective view of the car seat base of FIG. 2 with the anti-rebound device in an extended position, according to embodiments of the invention.

Referring to FIGS. 2-4, car seat base 10 is configured to be attached to a vehicle seat. Car seat base 10 is part of a two-part transportation system, along with a corresponding child car seat that holds the child. The reason for having a separate car seat base 10 is that, in some cases, there is a need to take the car seat itself in and out of the vehicle—for example, transferring an infant car seat from the vehicle to a stroller, and vice versa. The car seat base 10 remains permanently installed in the vehicle. Replacing the car seat thus requires only attaching the car seat to the car seat base 10, making reinstalling the car seat faster, simpler, and safer.

Car seat base 10 is composed of a frame, including lower outer portion 12 and upper outer portion 14. The frame may include various internal components and safety features, such as those described in the copending international application, filed on herewith date, which claims priority to U.S. Provisional Patent Application 62/930,008, filed Nov. 4, 2019, entitled "Safety Seat Protecting From Side Impact" the copending international application, filed on herewith date, which claims priority to U.S. Provisional Application 62/930,003, filed Nov. 4, 2019, entitled "Methods and Systems for Safety Seat", the contents of which are incorporated herein by reference as if fully set forth herein. Lower outer portion 12 and upper portion 14 define a distal portion, which is the portion closer to the vehicle seat back when the car seat base 10 is installed, and a proximal portion, which is the portion closer to the front of the vehicle seat when the car seat base is installed.

Lower outer portion 12 includes abutments or arms 16 for Isofix connectors 34. Isofix connectors 34 are also referred to herein as "connecting latches." The Isofix connectors 34 are configured to latch onto corresponding fittings that are attached to the vehicle seat. The fittings may also be referred to herein as child safety seat attachment points. In a preferred embodiment, the Isofix connectors 34 are laterally fixed, meaning that the arms 16 are not adjustable in length. An advantage of this embodiment is that the user is unable to make any installation errors when adjusting the length of the arms 16. In addition, the car seat base 10 is properly secured against the back of the vehicle seat due to the self-extending action of the anti-rebound device, as will be discussed further herein.

The frame also includes seat belt guide 36. The seat belt guide 36 is in the distal portion of the car seat base, and provides a passageway for threading a seat belt therethrough, for attachment to a buckle.

The upper portion 14 includes an anti-rebound device 18. Anti-rebound device 18 is fixedly connected to the distal end of upper portion 14, and is releasably connected to the proximal end. The anti-rebound device 18 is convertible between a folded position (FIGS. 2 and 3), in which the anti-rebound device 18 is somewhat parallel to the frame 14, and an extended position (FIG. 4), in which the anti-rebound device 18 forms a wide angle with the frame and contacts a back rest of the vehicle seat, to thereby limit rebounding of the car seat base 10.

Push button release mechanism 20 is located on the upper portion 14, proximal to the anti-rebound device 18. Depression of the push button 20 releases the anti-rebound device 18 from the folded position into the extended position. In alternative embodiments, the release mechanism for the anti-rebound device 18 does not include a push button, and the anti-rebound device 18 is automatically released into the extended position upon attachment of the car seat base 10 to the vehicle seat.

Telescopic load leg 22 extends below the proximal portion of frame 12. Telescopic load leg 22 includes base section 21 and extension section 23. The extension section 23 is adjustably extendible from the end of base section 21 to the floor of the vehicle.

Telescopic load leg 22 is pivotably attached to the frame, e.g., with a hinge. The load leg 22 is pivotable from a folded position beneath or within the frame 12 to an extended position between the frame 12 and the vehicle floor. Advantageously, when the car seat base 10 is not installed in a vehicle, the telescopic load leg 22 folds into a cavity within frame 12 for compact storage. Load leg 22 may also include hinge lock 29, which may lock the load leg 22 in the extended position when the car seat base is installed on the vehicle. Hinge lock 29 may be any suitable lock, e.g., a mechanical lock or a magnetic lock.

Car seat base 10 may include one or more handles or grips to assist a user in transporting and placing the car seat base. The handles or grips may be on all faces of the car seat base 10, including the front, rear, and sides. In the depicted embodiment, handle 24 is formed within the anti-rebound device 18. When the anti-rebound device 18 is in the folded position, the handle 24 is positioned such that a user may carry the car seat base 10 therewith. In some embodiments, when the user carries the car seat base 10 holding the handle 24, the telescopic load leg 22 (at this point, with leg extension 23 not extended) automatically pivots into the extended position. Once pivoted into the extended position, the load leg 22 may be locked by hinge lock 29 so as to stay in the extended position. Advantageously, in such embodiments, a user bringing the car seat base 10 to the vehicle while grasping the handle 24 will naturally place the car seat base 10 onto the vehicle seat with the telescopic leg 22 in its unfolded position. The handle 24 thus, in addition to providing an aid in transport, also helps prevent an installation error, e.g., in which the car seat base 10 is attached to the vehicle seat while the telescopic leg 22 is folded underneath or within the frame 12.

Car seat attachment points 27 are configured in the center of the frame. When the anti-rebound device 18 is in the folded position, the car seat attachment points 27 are concealed by the anti-rebound device 18. Car seat attachment points 27 are configured for attachment of corresponding portions of a car seat thereto, in any manner known to those of skill in the art. Concealing the attachments points 27 before completing the installation of the ISOFIX and anti-rebound device provides additional safety, as the child car seat cannot be installed if the base 10 is not connected or if the anti-rebound device 18 is not extended.

As indicated particularly in FIGS. 1 and 3, car seat base 10 further includes a series of sensors 11, 13, 15, 17, 19, 25.

Each of the sensors is associated with a different functional portion of the car seat base 10. Sensor 11 is located on or near abutment 16 and determines whether Isofix connectors 34 are latched onto corresponding fittings on the vehicle seat. Sensor 11 may be any type of sensor known to those of skill in the art, for example, a proximity sensor, a magnetic field sensor, a microswitch, or a pressure sensor. In preferred embodiments, sensor 11 is a discrete Hall Effect sensor or a reed switch. As used in the present disclosure, the term "discrete" Hall Effect sensor may also be referred to as a "digital" Hall Effect sensor. A digital Hall Effect sensor outputs two states—off and on. For example, when there is no magnetic field around a flowing current, the state is "off," and when there is a magnetic field that diverts the current according to the Hall Effect, the state is "on." A reed switch also operates based on a magnetic field. A reed switch includes a pair of ferromagnetic flexible metal contacts in a hermetically sealed glass envelope. The contacts may be normally open and close in the presence of a magnetic field, or vice versa.

In the operation of sensor 11, the Isofix connectors may include magnets, such that a magnetic field may be generated when portions of Isofix connectors 34 are displaced to permit entry of the Isofix fittings. Also, in a preferred embodiment, there are two such sensors 11, one for each Isofix connector 34.

Sensor 19 is located on or near seat belt guide 36 and determines whether a seat belt has been passed through the seat belt guide and is buckled. Sensor 19 may, for example, be a pressure sensor configured to measure the downward pressure exerted by the seat belt on the seat belt guide 36. In addition or alternatively, sensor 19 may also be used to determine whether the car seat base 10 is attached to the vehicle seat, even via the seat belt. In preferred embodiments, sensor 19 is a discrete Hall Effect sensor or a reed switch. Anti-rebound device extension sensor 13 determines whether the anti-rebound device 18 is released from its folded position to its extended position. For example, sensor 13 may be an angle or tilt sensor. Alternatively, sensor 13 may monitor the status of a release mechanism of the anti-rebound device 18. In preferred embodiments, sensor 13 is a discrete Hall Effect sensor or a reed switch. Leg angle sensor 15 senses the angle of telescopic leg 22, and in particularly whether it is fully extended into the extended position. Leg pressure sensor 19 senses the pressure exerted on the telescopic leg 22 by the floor of the vehicle, to thereby determine whether the telescopic leg has been completely extended. The leg angle sensor 15 and/or leg pressure sensor 19 may also include an analog Hall Effect sensor, which detects an extent of leg extension and folding, based on a measure of voltage generated due to the Hall Effect.

Finally, sensor 25 is configured near car seat attachment points 36. Sensor 25 may sense whether a car seat is attached to the car seat base 10. The detection of whether a car seat is attached may be performed with two discrete Hall Effect sensors or reed switches, for example on a left side and right side of the car seat base 10. Sensor 25 may also include various sensors regarding the position of the car seat and a child restrained therein, such as the orientation of the car seat (e.g., front facing or rear facing), whether the buckles in the car seat are buckled, how the buckles in the car seat are positioned, whether a child is in the car seat, the reclining angle of the car seat, and whether the car seat was subjected to substantial forces and is not suitable for usage or installation. The buckle status sensors and accident sensors may be discrete Hall Effect sensors or reed switches. Certain of the above detection functions, such as installation direction and seat type, may be performed with an RFID reader or an NFC reader, as will be discussed further below.

For example, sensor 25 may include a magnetic field sensor for sensing whether a seat belt of the car seat is buckled. The sensor may include a fixed magnet within the car seat base 10, and a movable magnet that is attached to a pivotable lever within the frame of the car seat. In an alternative configuration, the pivotable lever and movable magnet are in the frame of car seat base 10. Buckling the car seat buckle may exert pressure on the pivotable lever (for example, via a spring mechanism), causing the movable magnet to pivot and come into contact with the sensor. Regardless of the location of the movable magnet, a reed switch or discrete Hall Effect sensor is configured within car seat base 10 for sensing the effect of the induced magnetic field.

In another example, sensor 25 may include a magnetic field sensor for sensing whether a child is within the car seat. This magnetic field sensor may also include a fixed magnet within the car seat base 10, and a movable magnet that is attached to a pivotable lever within the frame of the car seat. The pivotable lever may be locked from pivoting prior to attachment of the car seat to the car seat base 10. In an alternative configuration, the pivotable lever and movable magnet are configured within car seat base 10. In this configuration, the pivotable lever may be locked from pivoting prior to installation of the car seat base 10 in a vehicle, for example, by a mechanical bar attached to arms 16. Installation of the car seat base 10 in the vehicle causes rearward movement of arms 16, which moves the mechanical bar, releasing the pivotable lever. Placement of a child in the car seat may exert pressure on the lever (for example, via a spring mechanism placed substantially below the center of weight of the child within the car seat), causing the movable magnet to pivot and come into contact with the sensor. A reed switch or discrete Hall Effect sensor is configured within the car seat base 10 for sensing the effect of the induced magnetic field.

One advantage of the embodiments described above is that the buckling status of the car seat and the presence of the child within the car seat may be detected even though the car seat itself does not have any electronics or any power source.

Other sensors, for example, sensors for determining whether the car seat was subjected to substantial forces and is not suitable for usage or installation, may be substantially similar to those described in the above-referenced copending patent applications.

The depicted locations for the sensors are merely schematic, and the sensors may be located at any suitable location for achieving the functions described herein, as can be recognized by those of skill in the art.

The sensors 11, 13, 15, 17, 19, 25 may detect both whether a functional portion of the car seat base 10 has been initially installed (e.g., whether anti-rebound device 18 has been fully extended) and also whether an error status has arisen in connection with the monitored functional portion (e.g., whether anti-rebound device 18 is no longer fully extended).

Car seat base 10 further includes a plurality of light emitting elements 26, 28, 30, 32, 40. The light emitting elements may be comprised of any material suitable for displaying a light signal, for example, an LED. The LEDs may be of any suitable color and of any suitable dimension. Light emitting element 26 is located on or near abutment 16. Light emitting element 28 is located on the upper portion 14, adjacent to push button release mechanism 20. Light emitting element 30 is located in the proximal portion of the car seat base 10, near the point of connection of telescopic load leg 22 to frame 12. Light emitting element 32 is located in the distal section of car seat base 10, near car seat attachment points 36. Finally, central light interface 40 is centrally located on the upper portion 14 of the car seat base 10, in the proximal section, which is an area of high visibility. The depicted locations for the light emitting elements are merely illustrative, and the light emitting elements may be located at any suitable location for achieving the functions described herein, as can be recognized by those of skill in the art.

Electrical console 38 is also configured within frame 12. Electrical console 38 includes an on-board computer, also referred to herein as a control unit. The on-board computer includes a central processing unit (CPU) with programmable circuitry, also referred to herein as an on-board processor. The depicted location for the on-board computer is merely schematic, and the electrical console may be located at any suitable location within the frame 12.

The electrical console 38 is electrically connected to the sensors 11, 13, 15, 17, 19, 25, and the light emitting elements 26, 28, 30, 32, 40. Through these electrical connections, the on-board computer is configured to receive inputs from the sensors 11, 13, 15, 17, 19, 25, to analyze the inputs, and to instruct the light emitting elements 26, 28, 30, 32, 40 to emit light signals based on the received inputs, as will be described in further depth below.

Electrical console 38 may also include a communication module and a speaker. The communication module may wirelessly communicate information regarding a status of the sensors, or a status of installation of the car seat base 10, to a mobile device. The wireless communication can be through any protocol known to those of skill in the art, e.g., Bluetooth or Wi-Fi communication or cellular or any other combination thereof. The speaker may be used to deliver an audible message regarding a status of the sensors or a status of installation of the car seat base. Electrical console 38 may also include a power source, e.g., one or more batteries.

The electrical console 38 may also include a near field communication (NFC) or radiofrequency identification (RFID) reader. The car seat may include an NFC or RFID chip which is readable by the NFC or RFID reader. Advantageously, these technologies enable the car seat to transfer information to the car seat base 10, without having a power source in the car seat. Exemplary information that may be conveyed via the NFC or RFID chips includes: the type of seat that is connected, specific identification of the seat that is connected (for example, a serial number), direction of the seat (for example, forward or backward facing).

In an alternative embodiment, car seat base 10 is part of a single child restraint system, in which the car seat base 10 is formed as one integral device with the car seat itself. In such embodiments, lights and sensors described above as located on the car seat base 10 may be installed on the car seat instead.

Referring now to FIGS. 5A-5E and 6A-6E, the process by which car seat base 10 guides a user through the installation process will now be described. The car seat base 10 has a specific order, or flow, for the installation steps. Following the designated order ensures that the installation is performed in the simplest way and a shortest time. During the installation process, the sensors 11, 13, 15, 17, 19, 25, light emitting elements 26, 28, 30 32, 40, and the processor cooperate to provide guidance to the user as to which installation step to perform next. Optionally, simultaneously, the communication module communicates the progress of the installation to a user's mobile device. The mobile device may run an application that provides a visual instruction—for example, a short video—on how to perform the subsequent installation step.

In the depicted illustration, the installation proceeds in five steps, following bringing of the car seat base 10 to the vehicle seat: (1) attachment of the car seat base 10 to the vehicle, whether via the seat belt or via attachment to Isofix fittings 52; (2) release and extension of the anti-rebound device 18; (3) extension of the telescopic load leg 22; (4) attachment of the car seat to the car seat base 10; and (5) engaging the child seat buckle when the child is in the seat.

Figure 5A:
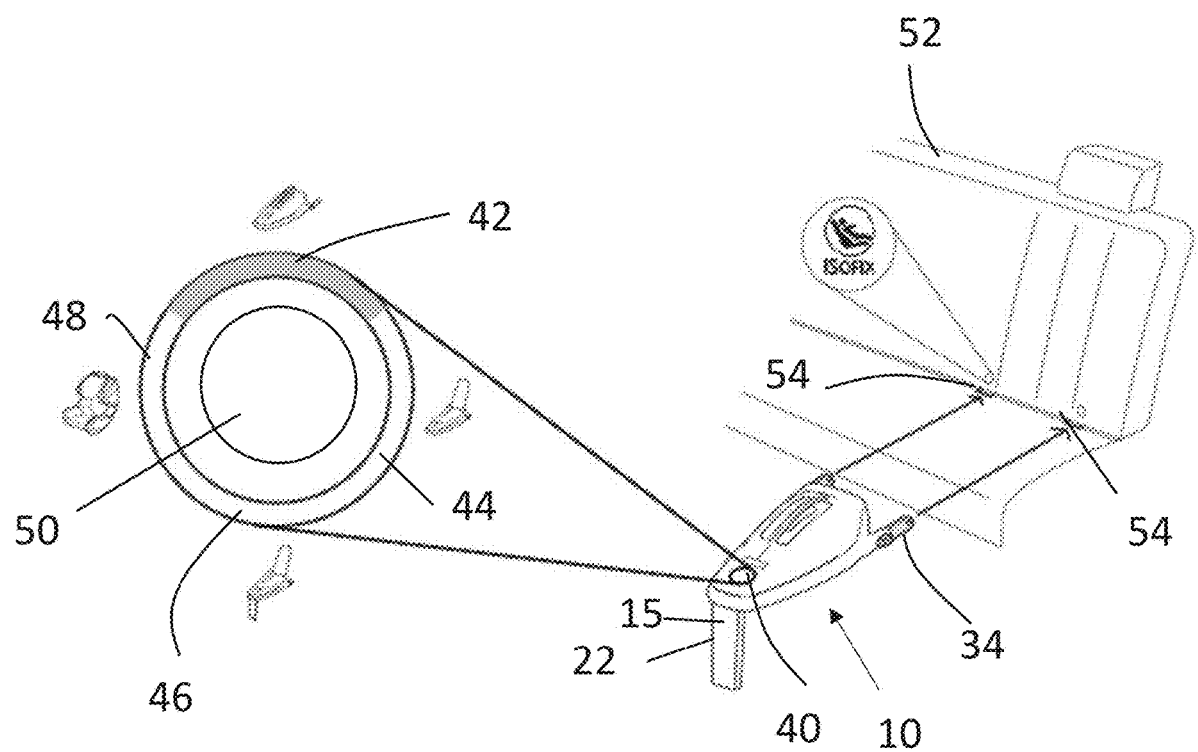
FIG. 5A is a depiction of a central light interface of the car seat base of FIG. 2 during or following attachment of the car seat base to a vehicle seat, according to embodiments of the invention.

Referring to FIG. 5A, prior to commencement of the five installation steps, a user begins the installation process by placing the car seat base 10 on a vehicle seat 50. The base 10 is placed on the seat 52 while telescopic load leg 22 is pivoted into its extended position. As discussed above, the user may grasp the handle 24 or grips while placing the car seat base 10 onto the vehicle seat 52, so as to cause the load leg 22 to pivot automatically into the extended position, e.g., by the force of gravity.

Sensors detect the progress of the user in placing the car seat base onto the vehicle seat 50. Such sensors may include, but are not limited to, leg angle sensor 15, which detects that the telescopic load leg 22 is in the extended position. The sensors provide output to the processor indicating the status of the sensed position car seat base 10. The processor, upon receiving the output, is adapted to execute code instructions for identifying completion of a current installation step, in this case, placement of the car seat base 10 in position on the vehicle seat 52.

The processor is further adapted to execute code to instruct light emitting element 26 to emit a light signal. In one exemplary embodiment, the light signal is a solid red LED light. The light signal is emitted at light emitting element 26, which is on or adjacent to abutment 16. The light signal is emitted at this location in order to direct the user's attention to the location corresponding to the next installation step, which is attachment of the car seat base 10 to the vehicle seat 52. Advantageously, the light signal from light emitting element 26 will not light up unless the telescopic load leg 22 is in the unfolded position. Thus, the user will not mistakenly attach the car seat base 10 to the vehicle while the load leg 22 is folded underneath or within the frame.

As seen in FIGS. 5A-5E, central light interface 40 is comprised of light emitting elements arranged in a pattern. In the embodiment of FIGS. 5A-5E, the pattern is a ring of light. The ring of light 40 is divided five sections of light emitting elements, each of which corresponds to an installation step of the car seat base 10. Section 42 corresponds to attachment of the car seat base 10 to the vehicle 50; section 44 corresponds to release and extension of the anti-rebound device 18; section 46 corresponds to extension of the telescopic load leg 22; section 48 corresponds to attachment of car seat 56 to car seat base 10; and section 50 corresponds to the buckling of the child in the car seat 56.

Ring of light 40 is centrally located on the upper section 14 of the car seat base 10. Unlike light emitting elements 26, 28, 30, 32 which emit light at a location where the user is supposed to perform the next installation step, ring of light 40 is designed to communicate generally the progress of the entire installation process. When a user is supposed to perform a given installation step, i.e., whenever one of the light emitting elements 26, 28, 30, 32 displays a light signal indicating its location, a corresponding section of the ring of light 40 will display a first type of light signal. The light signal may be a solid light in a first color, for example, orange. When the user completes that given installation step, and a sensor senses that the installation step is complete, the corresponding section of the ring of light 40 will display a second light signal. The second light signal may be a solid light in a second color, for example, green.

The signals delivered by light emitting elements 26, 28, 30, 32 and ring of light 40 may be replicated by other communication techniques. For example, the speaker may deliver audible instructions to the user to perform a particular installation step. Alternatively, the communication module may wirelessly deliver a notification to an application on a user's mobile device. The application may be configured to display the status of the installation of the car seat, for example, by replicating the lights emitted by light emitting elements 26, 28, 30, 32 and ring of light 40. The application may also show a graphic and/or video instructing the user how to perform each installation step. For example, the graphic and/or video shows attachment of the Isofix connectors 34 to fittings 54 of the vehicle seat 52.

Referring again to FIG. 5A, the user then performs the first installation step of attaching the car seat base 10 to the vehicle seat 52. As discussed above, this step may be performed in two alternative ways: (1) by passing the vehicle seat belt through seat belt guide 36 (not shown in FIG. 5A) or (2) by attaching Isofix connectors 34 to corresponding fittings 54 of the vehicle seat 52. Following attachment of the car seat base 10 to the vehicle seat 52, the sensors detect the attachment. If the car seat is attached with the seat belt, sensor 19 (shown in FIG. 3) senses the pressure of the vehicle belt on the seat belt guide 36. If the car seat is attached with the Isofix connectors 34, sensor 11, if it is a tension sensor, senses the tension on the connectors 34 or on internal components of abutments 16. The processor receives outputs from sensors 11 and/or 19, determines that the attachment step is complete, sends an instruction to light emitting element 26 to stop emitting a signal, and sends an instruction to light emitting element 28 (shown in FIGS. 2-4) to emit a light signal. Light emitting element 28 is located adjacent to push button release mechanism 20 of anti-rebound device 18, and thus signals to the user to push the push button release mechanism 20 in order to release the anti-rebound device 18.

Figure 5B:
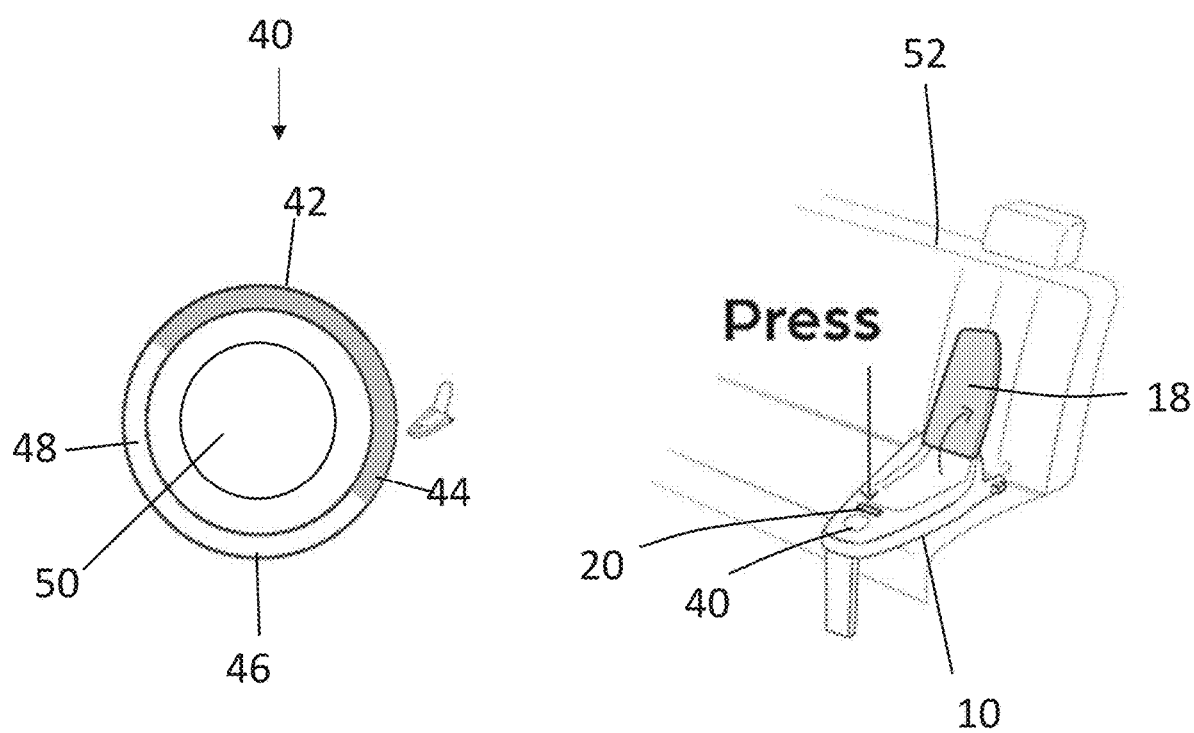
FIG. 5B is a depiction of the central light interface of FIG. 5A during or following extension of the anti-rebound device, according to embodiments of the invention.

Referring now to FIG. 5B, correspondingly, light 44 of the ring of light 40, corresponding to the anti-rebound device 18, emits the first type of light signal, and light 42 of the ring of light 40 emits the second type of light signal. The user then depresses the push button release mechanism 20 to release the anti-rebound device 18. Following release and extension of the anti-rebound device 18, sensor 13 (shown in FIG. 4) senses the extension of the anti-rebound device 18. The processor receives an output from sensor 13, determines that the extension of the anti-rebound device 18 is complete, sends an instruction to light emitting element 28 to stop emitting a signal, and sends an instruction to light emitting element 30 (shown in FIGS. 2-4) to emit a light signal. Light emitting element 30 is located adjacent to telescopic load leg 22, and thus signals to the user to extend load leg 22 to the floor of the vehicle.

Figure 5C:
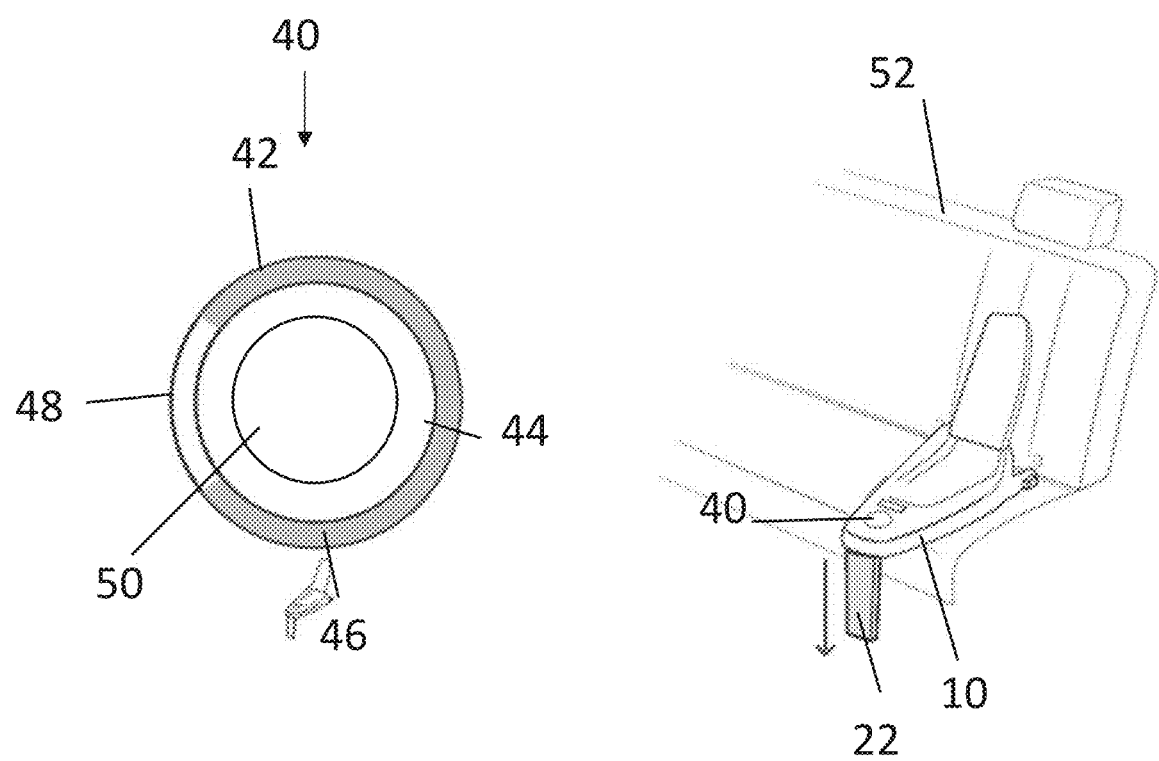
FIG. 5C is a depiction of the central light interface of FIG. 5A during or following telescopic extension of a load-bearing leg to a floor of the vehicle, according to embodiments of the invention.

Referring now to FIG. 5C, correspondingly, light 46 of the ring of light 40, corresponding to telescopic load leg 22, emits the first type of light signal, and light 44 of the ring of light 40 emits the second type of light signal. The user then extends extension section 23 of leg 22 until it is securely pressed against the floor of the vehicle. Following extension of leg 22, sensor 17 (shown in FIG. 4) senses the pressure on extension section 23. The processor receives an output from sensor 17, determines that the extension of the leg 22 is complete, sends an instruction to light emitting element 30 to stop emitting a light signal, and sends a signal to light emitting element 32 (shown in FIGS. 2-4) to start emitting a light signal. Light emitting element is located adjacent to car seat attachment points 27 (shown in FIG. 3), and thus signals to the user to connect car seat 56 to car seat attachment points 27.

Figure 5D:
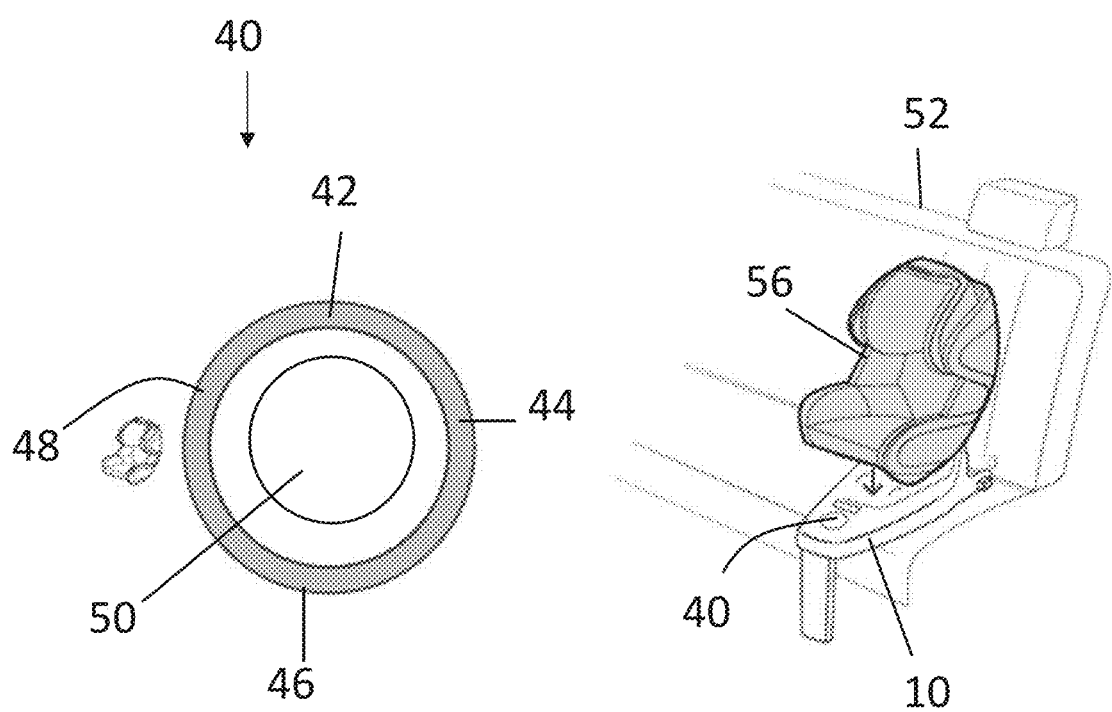
FIG. 5D is a depiction of the central light interface of FIG. 5A during or following attachment of a car seat to the car seat base, according to embodiments of the invention.

Referring now to FIG. 5D, correspondingly, light 48 of the ring of light 40, corresponding to car seat 56, emits the first type of light signal, and light 46 of the ring of light 40 emits the second type of light signal. The user then attaches the car seat 56 to the car seat base 10. When sensor 25 (shown in FIG. 4) detects that the car seat 56 has been correctly attached, it sends an output to the processor. Upon determination by the processor that the car seat has been correctly installed, the processor sends an instruction to light emitting element 32 to stop emitting a light signal, and to light 48 of the ring of light 40 to emit the second type of light signal.

Figure 5E:
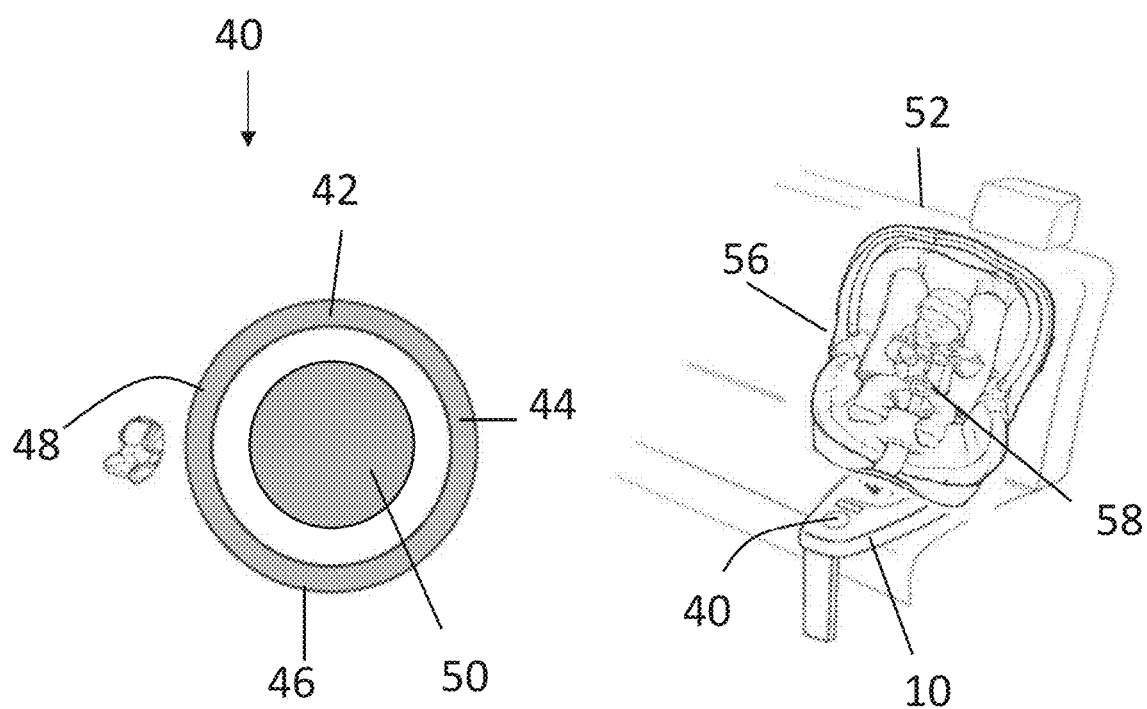
FIG. 5E is a depiction of the central light interface of FIG. 5A during or following buckling a child in the car seat, according to embodiments of the invention.
Figure 6A:
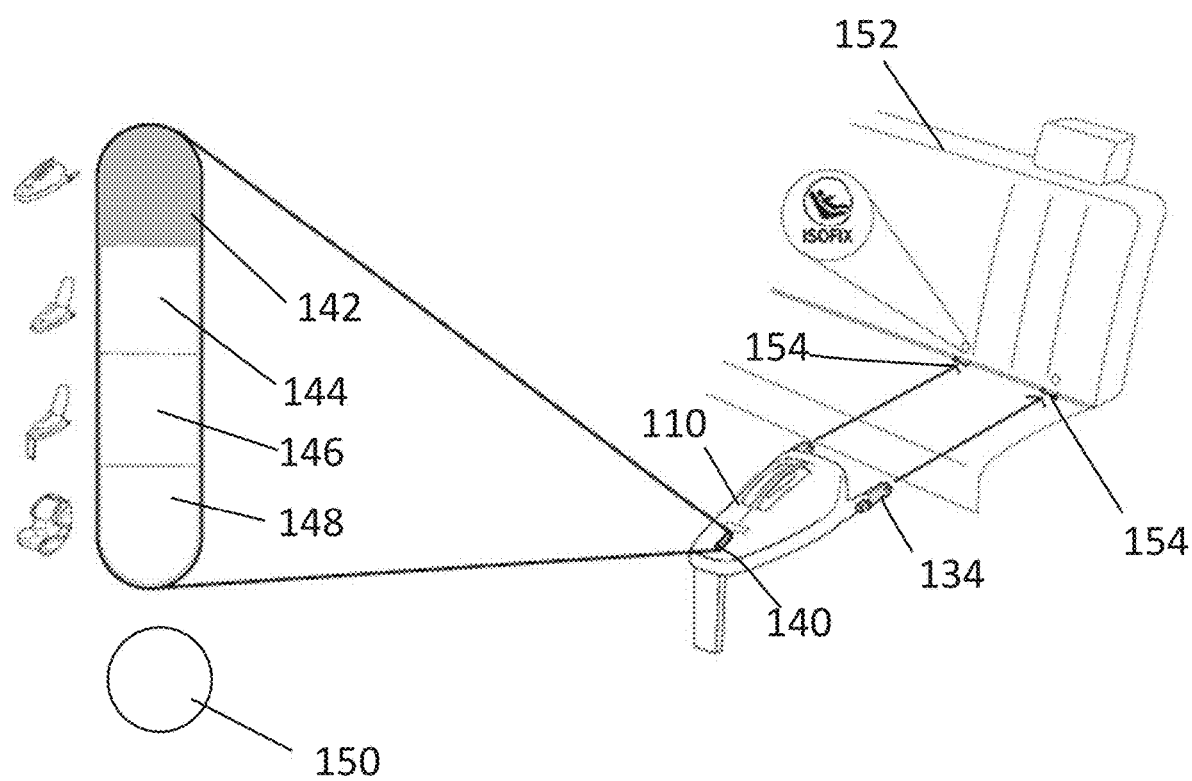
FIG. 6A is a depiction of a second embodiment of a central light interface during or following attachment of the car seat base to a vehicle seat, according to embodiments of the invention.
Figure 6B:
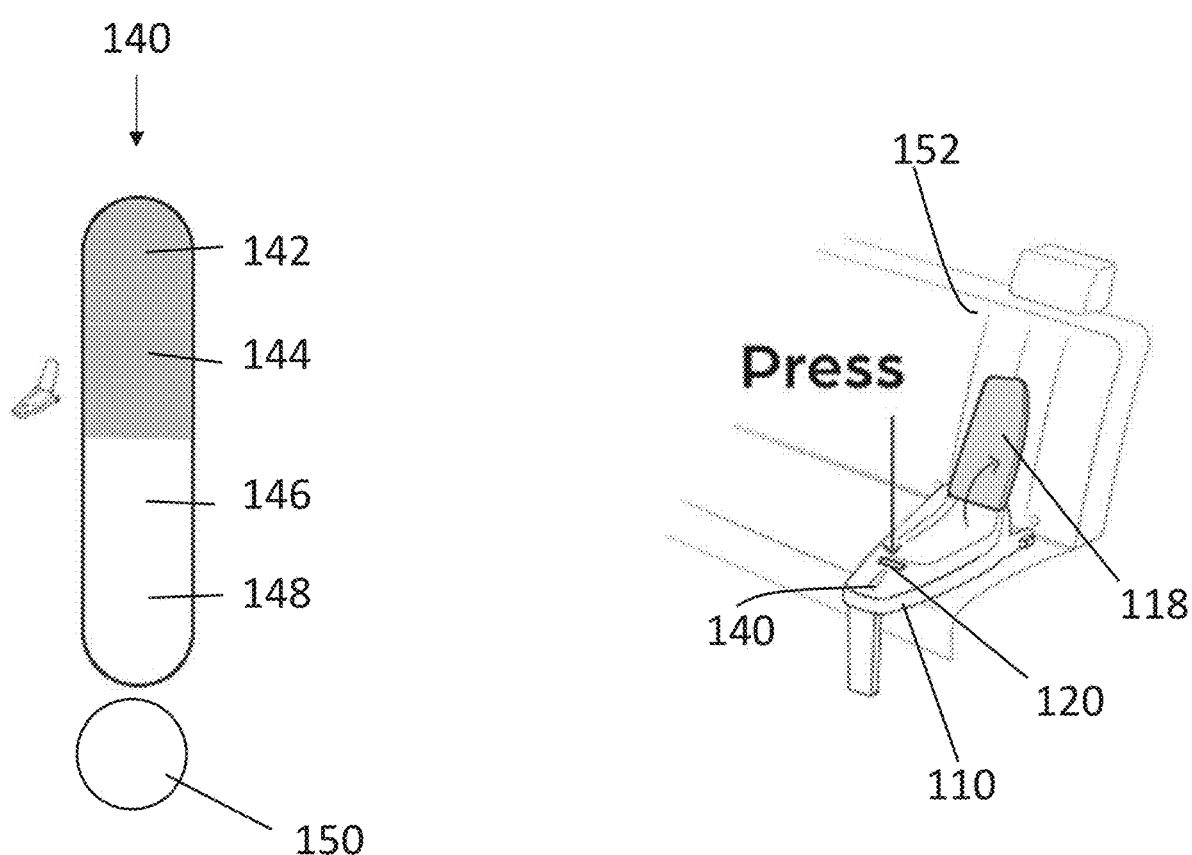
FIG. 6B is a depiction of the central light interface of FIG. 6A during or following extension of the anti-rebound device, according to embodiments of the invention.
Figure 6C:
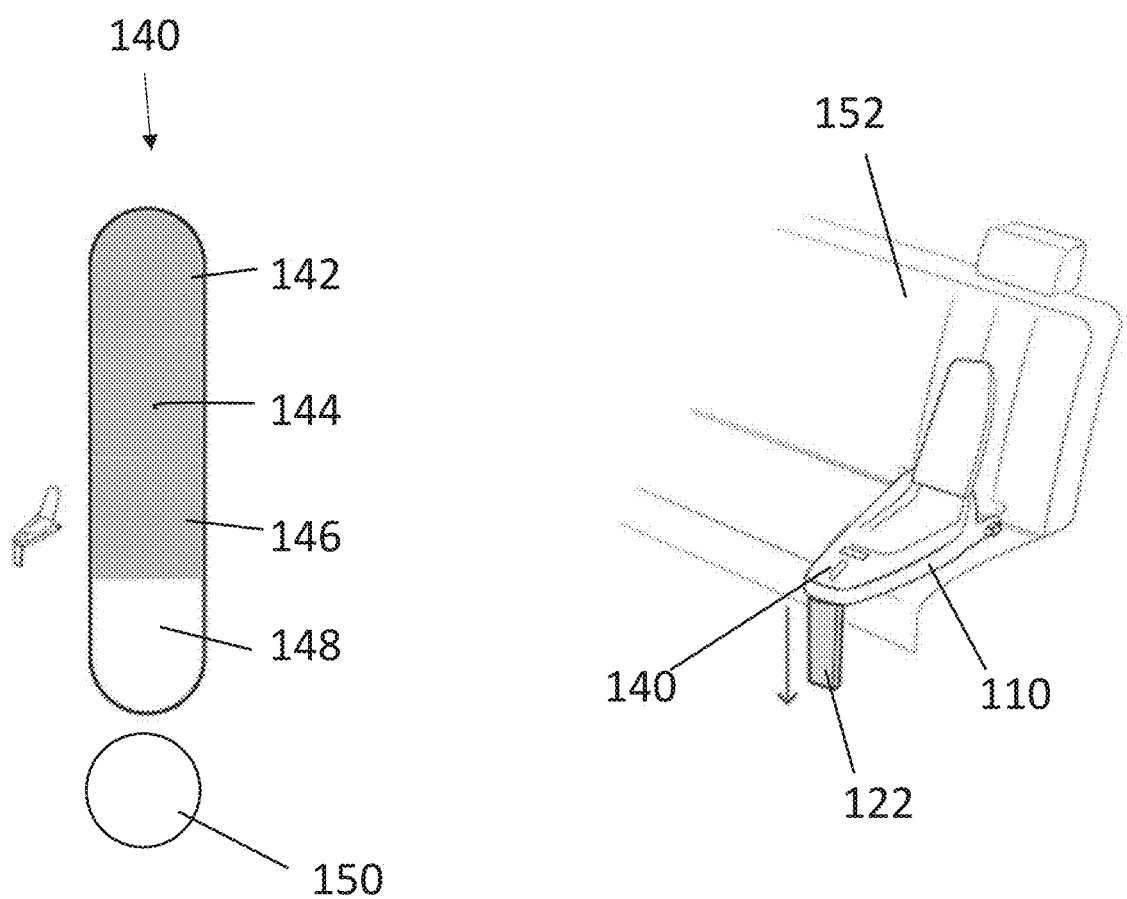
FIG. 6C is a depiction of the central light interface of FIG. 6A during or following telescopic extension of a load-bearing leg to a floor of the vehicle, according to embodiments of the invention.
Figure 6D:
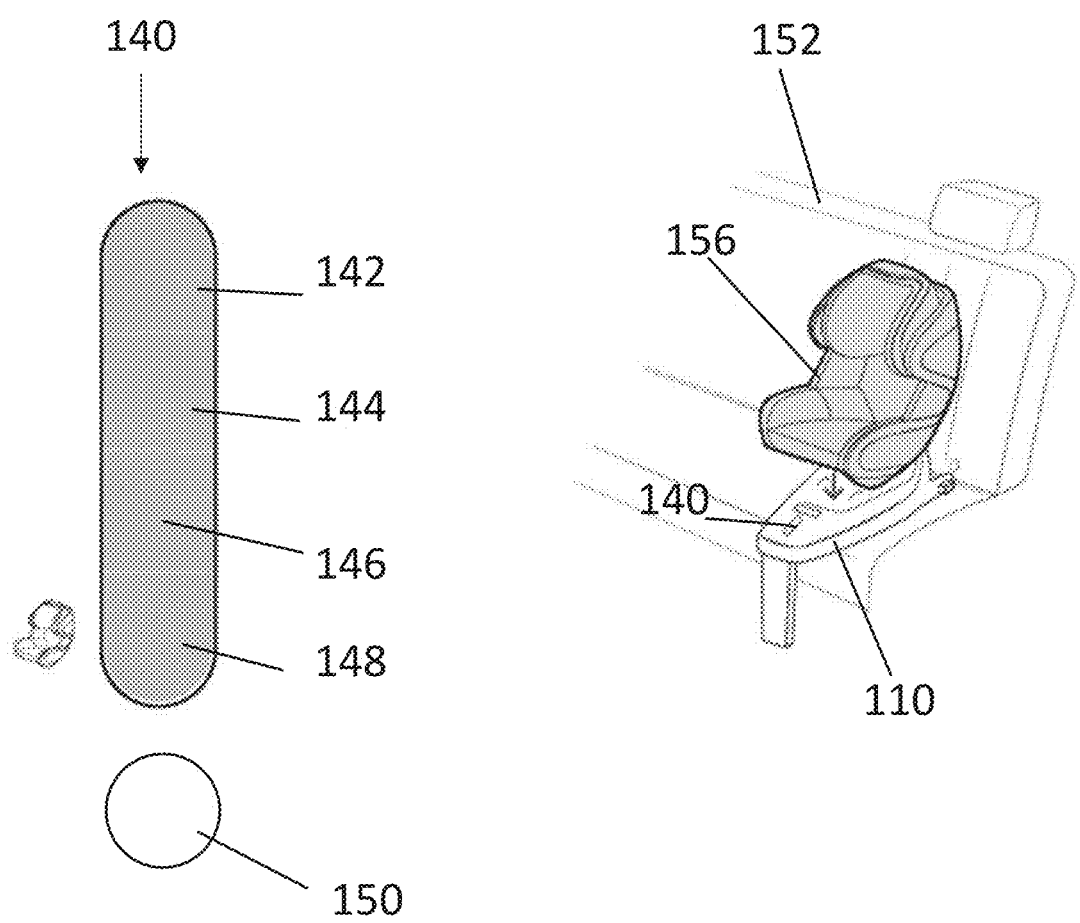
FIG. 6D is a depiction of the central light interface of FIG. 6A during or following attachment of a car seat to the car seat base, according to embodiments of the invention.
Figure 6E:
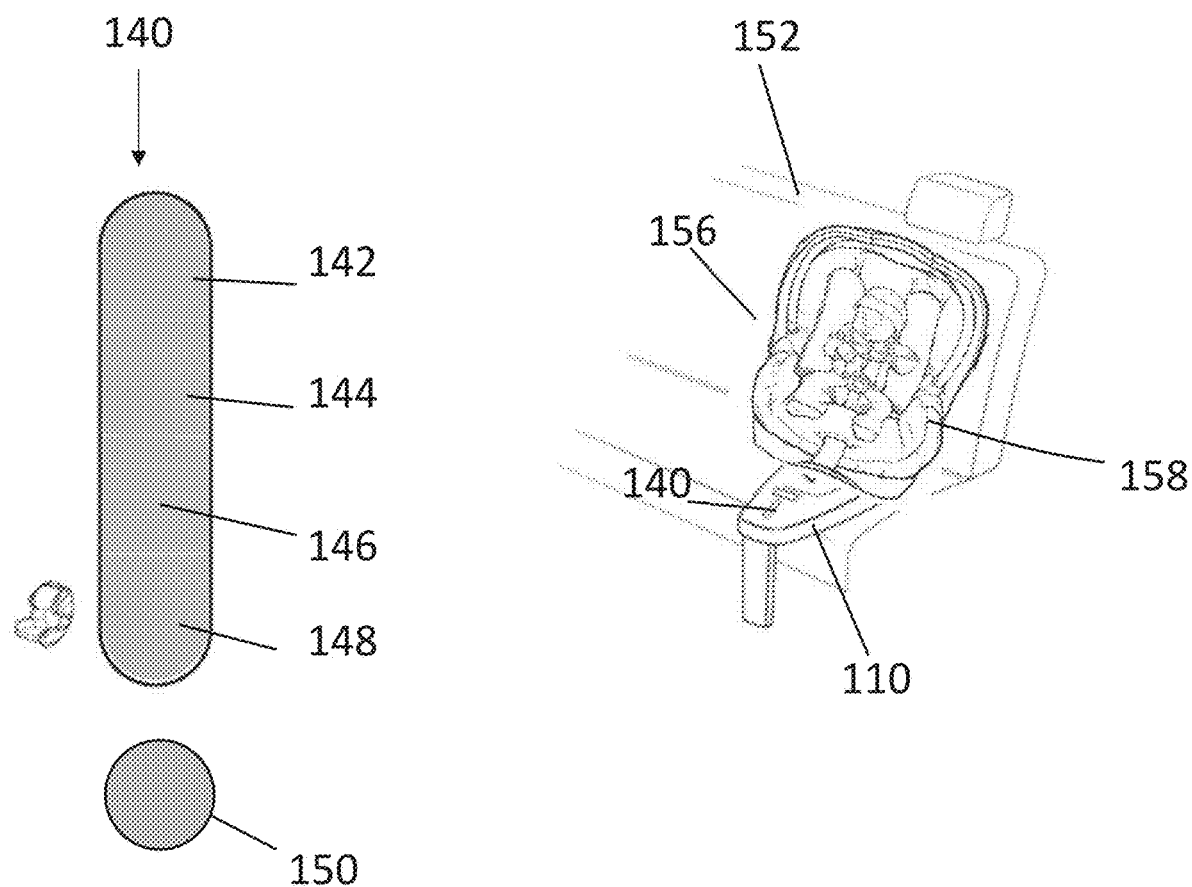
FIG. 6E is a depiction of the central light interface of FIG. 6A during or following buckling a child in the car seat, according to embodiments of the invention.

Referring to FIG. 5E, correspondingly, light 50 of the ring of light 40, corresponding to buckling of the car seat 56, emits the first type of light signal, and light 48 of the ring of light 40 emits the second type of light signal. The user then buckles the child into the car seat 56. Upon detection by a sensor that the child has been buckled in the car seat, the processor sends an instruction to ring of light 50 to emit the second light signal.

In addition to the above-described functionality during installation of the car seat base 10, the sensors, light emitting elements, speaker, and communication module may also be used to detect and communicate an error status of the car seat base 10. For example, in the case of an unsafe situation, the seat may set off a sound alarm and a light alarm. The light alarm may be a blinking light at the closest light emitting element 26, 28, 30, 32, a blinking light on the central light interface 40, or a color change on the corresponding portion 42, 44, 46, 48, 50 of the central light interface 40 (e.g., from green to red). The purpose of the alarms is to instruct the user to rectify the error. Unsafe situations that may provoke an alarm include: (1) installation step not completed correctly or completed in the wrong sequence; (2) child not buckled; (3) one of the parts of the car seat base 10 or car seat 54 not properly connected; (4) car seat 56 no longer structurally safe due to accident impact; and (5) a child left in the seat unattended.

FIGS. 6A-6E depict an alternative embodiment 110 of a car seat base. Unless otherwise specified, car seat base 110 is identical to car seat base 10, and thus similar elements are designated with similar reference numbers, except that the reference numbers begin with "1." Car seat base 40 has a central light interface 140, which depicts a linear pattern, rather than a circular pattern. The user can track the status of the installation by following the successive linear activation of lights in sections 142, 144, 146, 148, and 150, in the manner described above in connection with light interface 40.

Figure 7B:
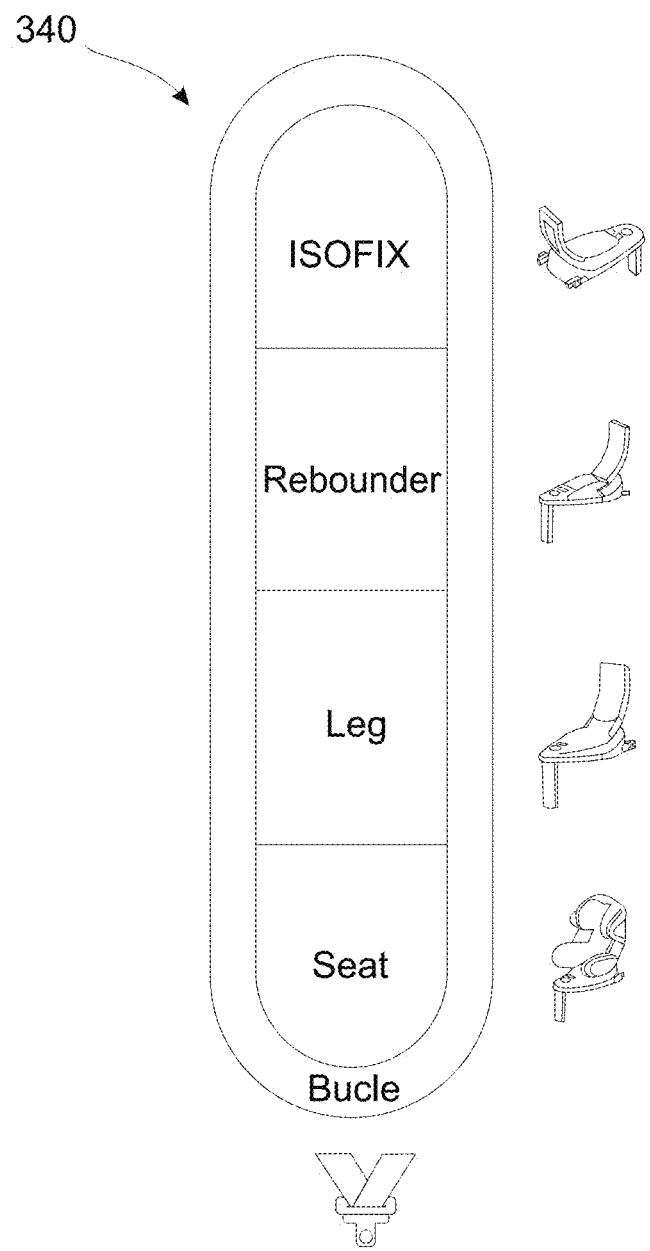
FIG. 7B is a depiction of a fourth embodiment of a central light interface.
Figure 7C:
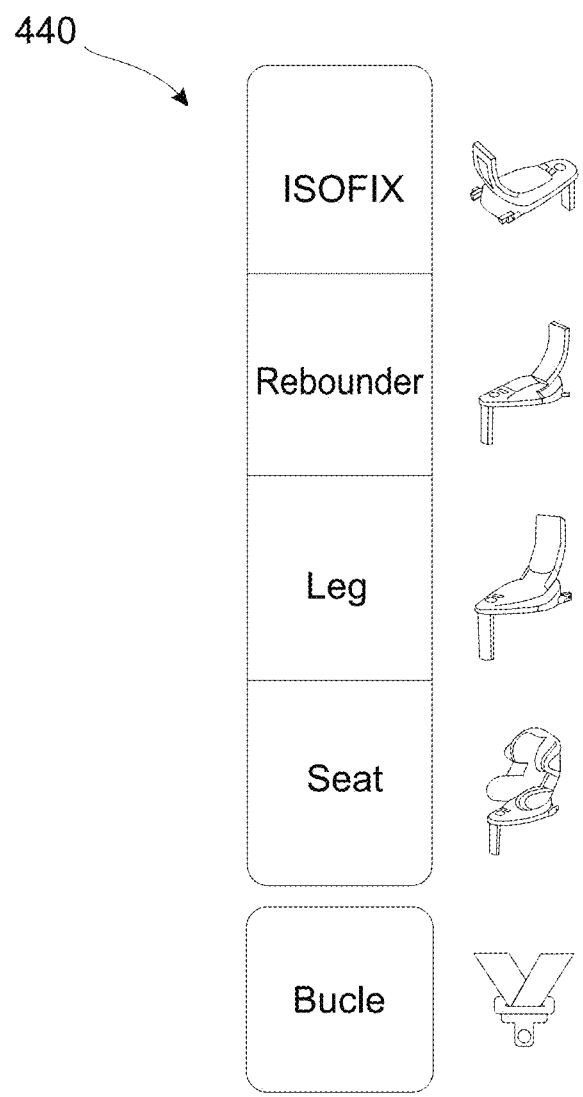
FIG. 7C is a depiction of a fifth embodiment of a central light interface.

FIGS. 7A-7C depict three alternative embodiments for central light interfaces 240, 340, and 440. The central light interfaces 240, 340, 440 differ from interfaces 40, 140 in that they include different patterns for the central light interface. For example, in interface 240, the fifth section is a linear light interface that runs parallel to the linear interface of the first four sections. Thus, the user can receive assurance that the installation of the car seat base 10 is complete, by completion of the first four sections of the pattern. Then, when the user buckles the child into the car seat, the user can receive separate assurance that the child was properly buckled, by reference to the separate section of the pattern.

Figure 8A:
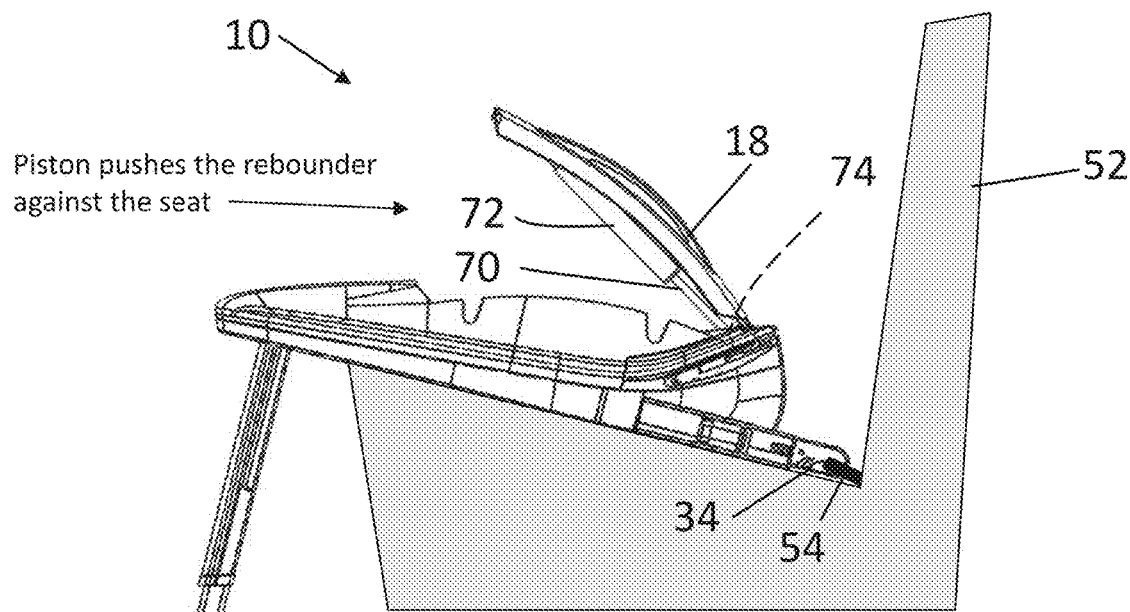
FIG. 8A is a depiction of an anti-rebound device of the car seat base of FIG. 2, in a partially extended position.
Figure 8B:
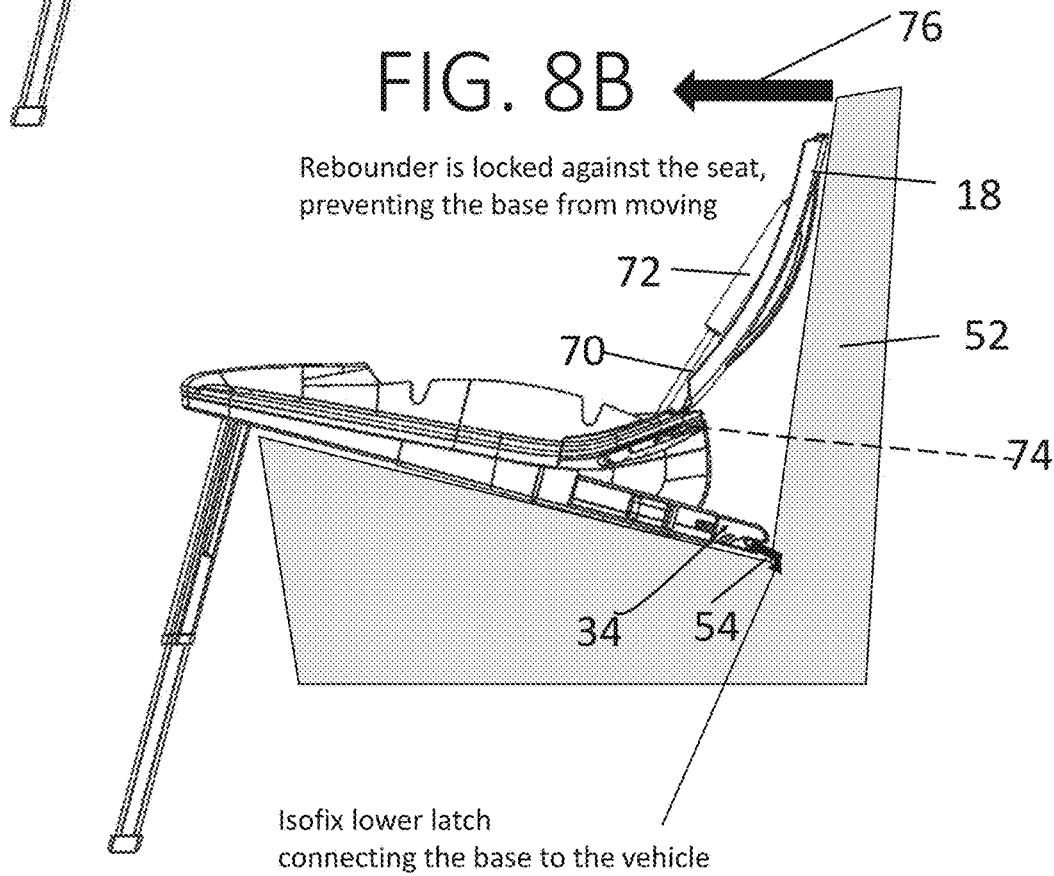
FIG. 8B is a depiction of an anti-rebound device of the car seat base of FIG. 2, in a fully extended position.

Referring now to FIGS. 8A-8B, the mechanics of the extension of anti-rebound device 18 are now discussed. Anti-rebound device 18 includes piston 70, which may be slidable within sheath 72. Torsion spring 74 is configured at a point of connection between the piston 70 and the distal end of lower outer section 12 of the frame of car seat 10. Additionally or alternatively, a helical spring or another plastically deformable device may be concealed within sheath 72 to control the sliding of piston 70 within sheath 72.

The torsion spring 74 is biased to cause the anti-rebound device 18 to extend backward toward the seat back of vehicle seat 52. When the anti-rebound device 18 is in the folded position, the push button release mechanism 20 retains the anti-rebound device 18 in place, against the rotational force of the torsion spring 74. When the push button release mechanism 20 is released, the torsion spring 74 extends automatically backwards, to extend the anti-rebound device 18 through a wide angle and secure the anti-rebound device 18 against the seat back of vehicle seat 52. When anti-rebound device 18 is fully extended, seat 52 exerts a forward pressure against it, in the direction of arrow 76.

When the anti-rebound device 18 is released, spring 74 applies force as a normal spring, without any interference from other mechanisms in the car seat base (e.g., push button release mechanism 20), such that the other mechanisms do not prevent the anti-rebound device 18 from opening.

Either the spring 74, or the release mechanism 20, or both, may further include mechanisms that prevent the anti-rebound device from closing to the folded position, once extended. Such mechanisms may include, but are not limited to, a ratchet or a uni-directional gas piston. In addition, the release mechanism 20 may prevent the anti-rebound device 18 from closing during a rear impact or in response to rebound generated by a frontal impact.

The piston 70 and torsion spring 74 are configured to adaptively adjust their configuration so as to secure the car seat base 10 from rebounding in response to an impact. In particular, the torsion spring 74 may adaptively adjust its tension in response to external forces applied to the vehicle seat back during an impact. In an accident, the car seat may exert force on the vehicle seat 52, compressing the foam of the vehicle seat 52, and thereby increasing the space between the anti-rebounding device 18 and the vehicle seat back. Without the adaptive adjustment of torsion spring 74, the car seat may be jolted backward into the space formerly filled by the seat foam. The adaptive adjustment, however, merely causes the anti-rebounding device 18 to open more, and reduces the bounce back of the car seat 10. This adaptive adjustment thus fixes the child car seat in place during an accident, and provides an advantage over fixed anti-rebounding devices (such as bars), which lack this capability for adaptive adjustment.

It is possible to design the piston 70 so that it compresses under specific forces and further absorbs energy in a rear impact or rebound effect. When the anti-rebound device is made with such a piston 70, the piston 70 dampens the forces applied to the child car seat during an impact. Such a mechanism for piston 70 can be realized by several means, including the attachment of the piston 70 to plastically deformable elements that elongate under force.

Another advantage of the adaptive adjustment is realized in the event that the car seat base 10 moves by a small amount. For example, if car seat base 10 is attached to the vehicle seat with a seat belt, and the seat belt tension changes, the car seat base 10 may move slightly relative to the vehicle seat back. In such an instance, the automatic rebound device 18 will adaptively adjust itself to ensure that it remains secured against the vehicle seat back.

Also, during a frontal accident, when the forces applied on the car seat cause the car seat base 10 to slightly move forward, the anti-rebound device 18 will self-adjust and lock the base 10 in place to prevent movement when the car seat rebounds.

FIGS. 9A-12B depict embodiments of a car seat base 510 which include a locking mechanism for anti-rebound device 518. While the locking mechanism is depicted here in connection with car seat base 510, it is to be understood that the locking mechanism is compatible in all other respects with features disclosed in connection with car seat base 10, including the system for advising users as to a progress of installation, the handle or grips, the load leg, and the push button release mechanism.

Figure 9A:
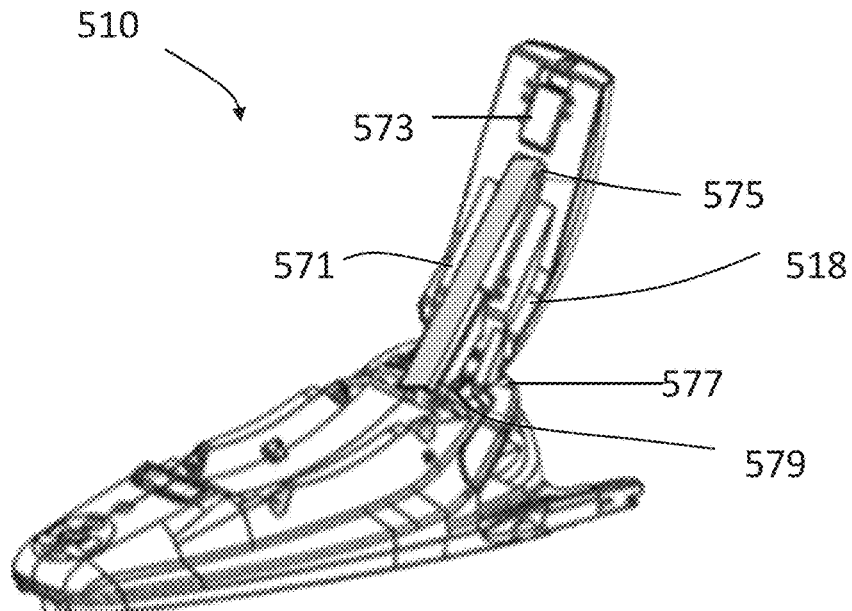
FIG. 9A is a depiction of another embodiment of a car seat base having anti-rebound device with a sleeve covering an extending mechanism and a locking mechanism.
Figure 9B:
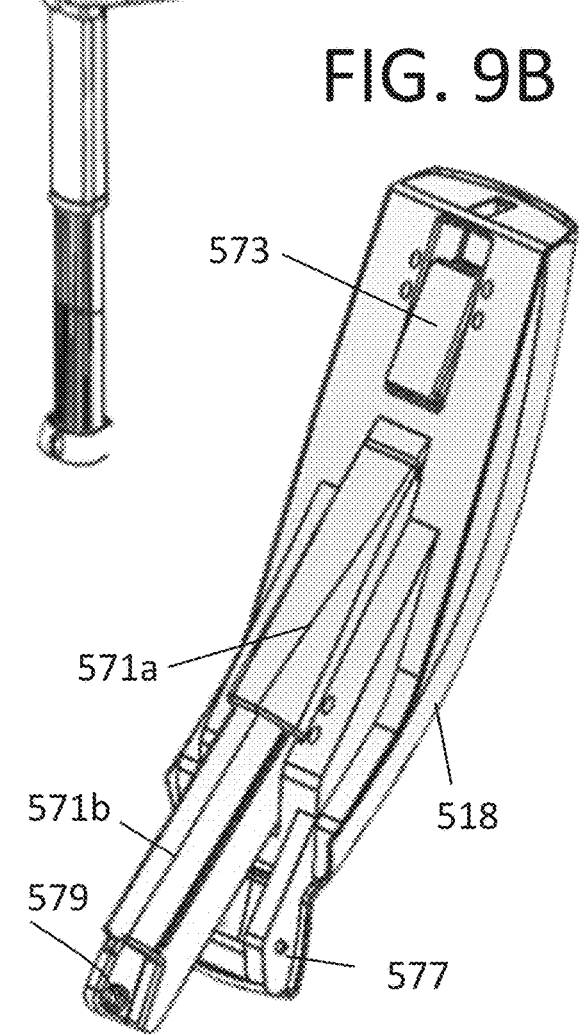
FIG. 9B is a perspective view of the anti-rebound device of the car seat base of FIG. 9A with the sleeve.
Figure 9C:
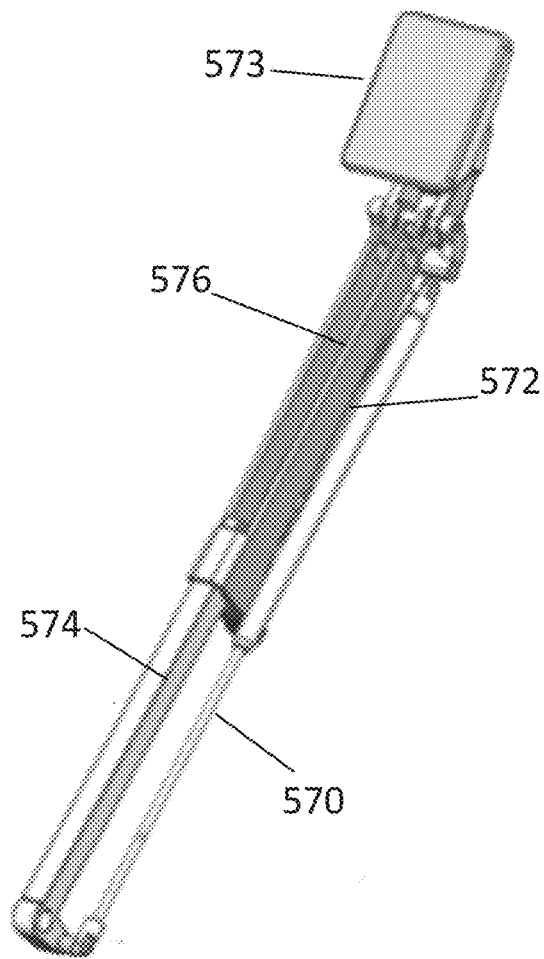
FIG. 9C is a perspective view of the anti-rebound device of the car seat base of FIG. 9A, showing the extending mechanism and locking mechanism with the sleeve removed.

Referring to FIGS. 9A-9B, anti-rebound device 518 includes a sleeve 571. FIG. 9C depicts the locking mechanism with the sleeve 571 removed. Sleeve 571 encloses the locking mechanism, piston 570 and sheath 572, as shown in FIG. 9C. Piston 570 and sheath 572 may operate substantially in the same manner as piston 70 and sheath 72 described above, for extending the anti-rebound device between the folded position and the extended position.

As shown in FIG. 9B, sleeve 571 may be comprised of upper half sheath 571a and lower half sheath 571b. Upper half sheath 571a is able to telescopically slide over the lower half sheath 571b, for easy storage when the anti-rebound device 518 is closed.

The locking mechanism includes upper lock arm 576 and lower lock arm 574. The lower lock arm 574 is slidably received within the upper lock arm 576. Piston 570 and sheath 572 are substantially parallel to, and mechanically connected to, upper lock arm 576 and lower lock arm 574. Extension of the piston 570, e.g., by operation of a spring, correspondingly causes the lower lock arm 574 to extend relative to the upper lock arm 576. Release pedal 573 is configured within the anti-rebound device 518 above upper attachment point 575. Extension of piston 570 may also exert a force on release pedal 573, to cause it to assume the position shown in FIG. 9C, in which the locking mechanism is locked.

Sleeve 571 and the elements contained therein (e.g., upper lock arm 576 and sheath 572) are attached to an upper end of anti-rebound device 518 at upper attachment point 575. Sleeve 571 is attached to the frame of the car seat base 510 at attachment point 579, which defines an axis of rotation for the locking mechanism, and the anti-rebound device 518 itself is separately attached to frame of the car seat base 10 at attachment point 577, which defines an axis of rotation for the anti-rebound device.

Figure 10A:
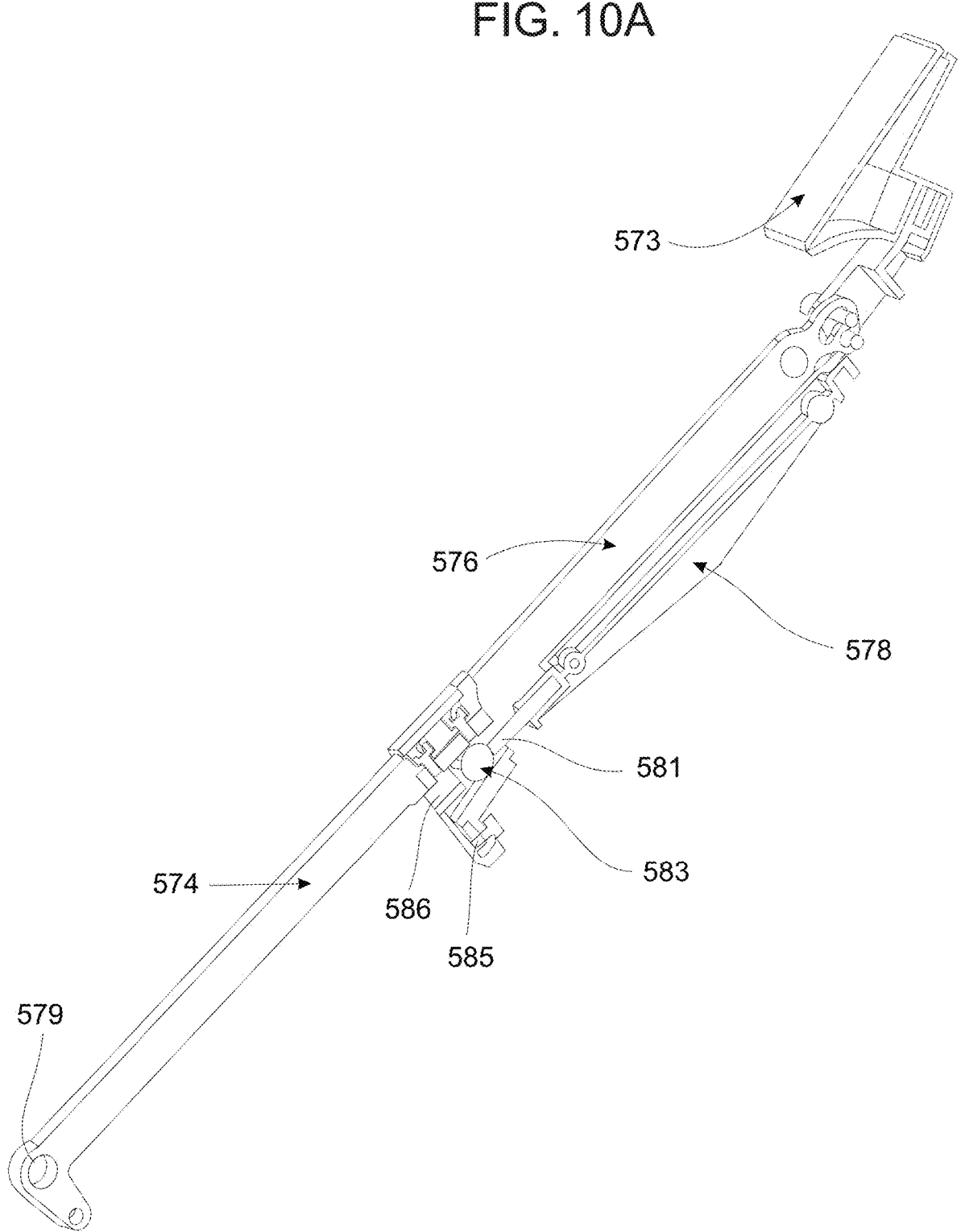
FIG. 10A is a perspective view of the locking mechanism of the anti-rebound device of FIG. 9A.
Figure 10B:
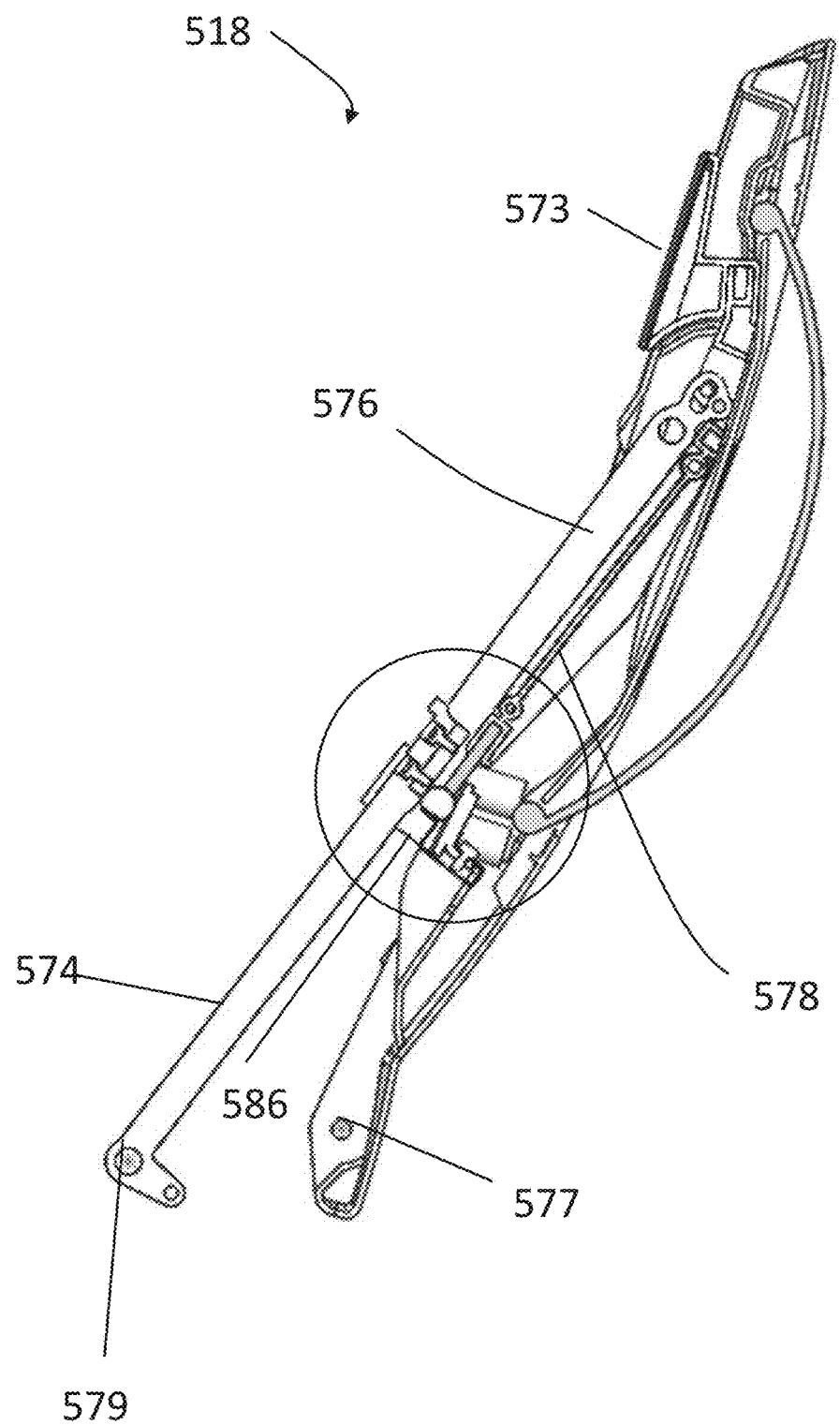
FIG. 10B is a side view of the locking mechanism of the anti-rebound device of FIG. 9A.

Referring now to FIGS. 10A and 10B, the upper lock arm 576 includes a tapered receptacle 586. Tapered receptacle 586 is comprised of two angled surfaces: one parallel to the orientation of lower lock arm 574, and a second directed at a sharp angle relative to the first surface. The receptacle 586 tapers upwards in a direction from attachment point 579 to release pedal 573. As used in the present disclosure, the term "narrow end" refers to the end of receptacle 586 that is closer to release pedal 573, and the term "wide end" refers to the end of receptacle 586 that is closer to attachment point 579. Angled surface 588 (shown in FIGS. 11A and 11B) is further from the lower lock arm 574 at the wide end, and is closer to the lower lock arm 574 at the narrow end.

A roller 583 is held within the receptacle 586 by a spring 585. Spring 585 forces roller 583 into a position in which it touches at least one angled surface of receptacle 586, as well as lower lock arm 574.

In addition, as seen best in FIG. 10A, release pedal 573 is mechanically connected, through arm 578, to lever 581. Lever 581 extends from arm 578 to the narrow end of the receptacle 586, opposite roller 583. In the illustrated embodiments, arm 578 is a separate element from sheath 572. In alternative embodiments, sheath 572 also functions as arm 578.

Figure 11A:
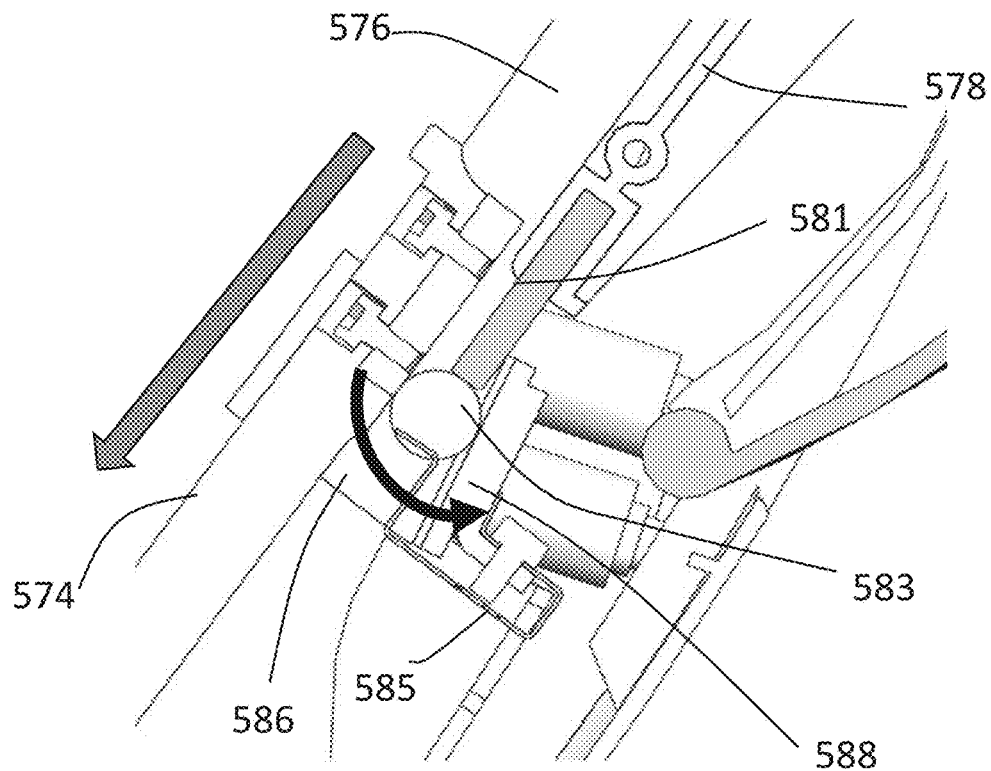
FIG. 11A is a close-up depiction of the locking mechanism during extension of the anti-rebound device.
Figure 11B:
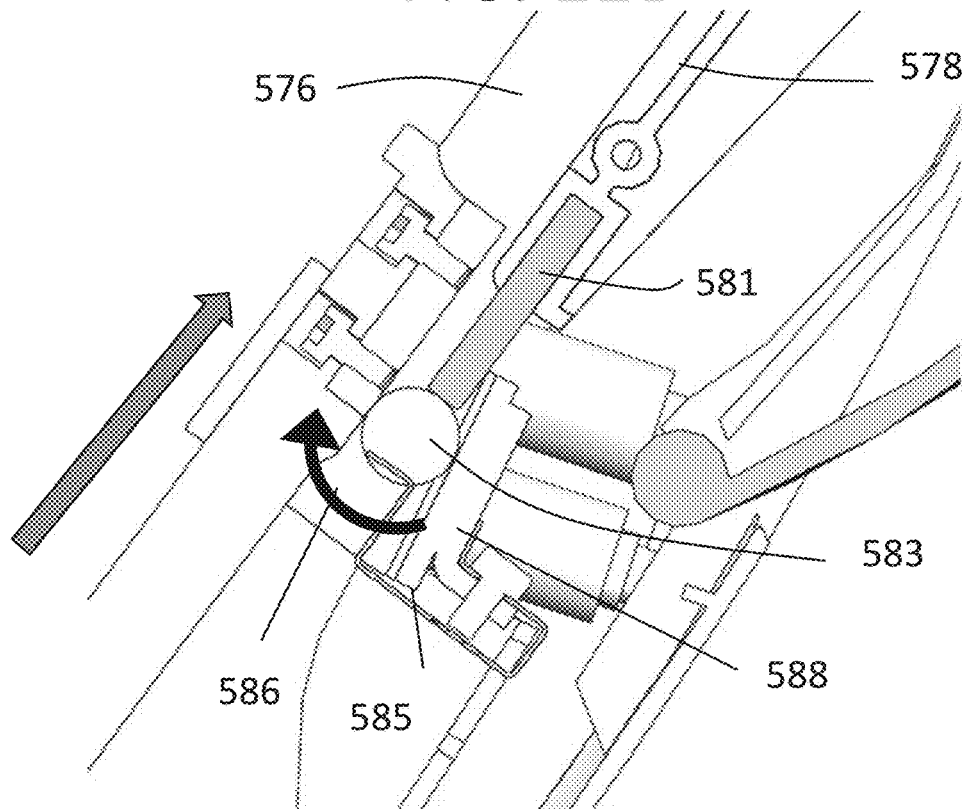
FIG. 11B is a close-up depiction of the locking mechanism during attempted retraction of the anti-rebound device.

FIGS. 11A and 11B show a close-up view of the circled area of FIG. 10B, and in particular demonstrate the operation of the locking mechanism. As shown in FIG. 11A, when the anti-rebound device 518 is opened, the locking mechanism is also correspondingly opened, and lower lock arm 574 slides through receptacle 586 in the direction of the arrow. Because the roller 583 is in contact with the lower lock arm 574, this lateral opening of the lower lock arm 574 is translated into a counterclockwise rotational movement of the roller 583. The roller 583 is consequently pushed in a downward direction toward the wide end of the receptacle 586. The downward movement of the roller 583 is countered by the force of spring 585. However, because the wide end of receptacle 586 is wider than the narrow end, there is space for roller 583 to rotate, and thus the rotation of roller 583 does not impede the extension of lock arm 574.

In FIG. 11B, the lower lock arm 574 is already extended, and is being pushed upwards relative to upper lock arm 576. The lateral movement of the lower lock arm 574 is translated to a rotational movement of roller 583 in a clockwise direction. This clockwise movement pushes the roller 583 upward, toward the narrow end of receptacle 586. Due to the tapering of receptacle 586 and in particular of the angled surface 588, roller 583 pins lower lock arm 574 in place, and prevents further retraction of the lower lock arm. Indeed, further retraction of the lower lock arm 574 only increases the strength of the locking action, because it causes roller 583 to be inserted further into the narrow end. The upward force of spring 585 ensures that constant friction is maintained between roller 583, angled surface 588, and lower lock arm 574.

FIG. 12A depicts release of the release pedal 573, and FIG. 12B is a close up view of the circled area of FIG. 12A. When release pedal 573 is pulled forward and downward, arm 578 is correspondingly pushed downward, via an eccentric mechanism. Depression of release pedal 573 causes lever 581 to displace roller 583 from its locked position in the narrow end (indicated by the dashed circle in FIG. 12B) toward the wide end. Once the roller 583 is displaced, lower lock rod 574 is again able to slide relative to upper lock rod 576, permitting the anti-rebound device 518 to close.

Reference is now made to FIGS. 13A to 15C, which depict the mechanics of push button release mechanism 20, and the interrelationship of push button release mechanism 20 with Isofix connectors 34 and seat belt guide 36. In order to make the installation process more intuitive, and to prevent improper installation of car seat base 10, it is advantageous to prevent release of the anti-rebound device 18 until the car seat base 10 is first properly secured to the vehicle. It is further advantageous to utilize a single mechanism for preventing and for permitting release of the anti-rebound device 18, regardless of how the car seat base 10 is secured to the vehicle—i.e., whether by the Isofix system or by the seat belt. The mechanism depicted in FIGS. 13A-15C provides this functionality.

Figure 13A:
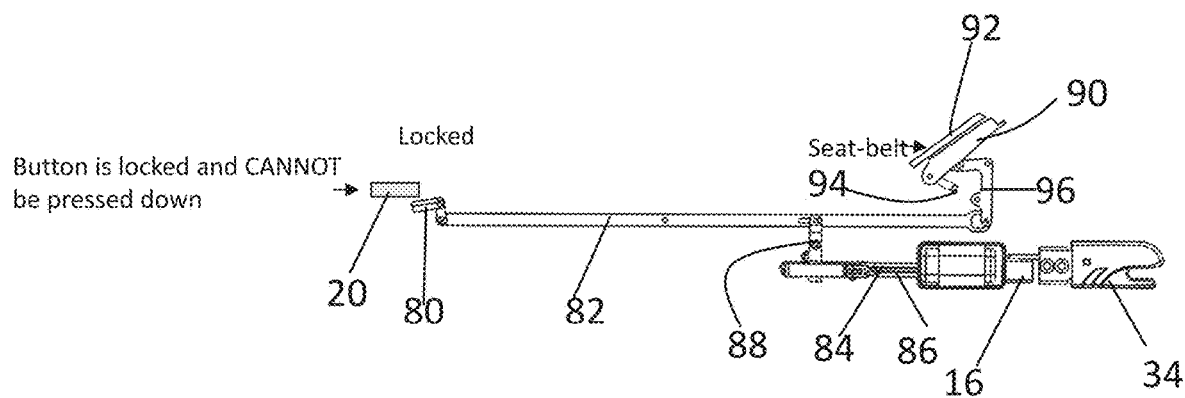
FIG. 13A is a schematic depiction of a push button release mechanism of the car seat base of FIG. 2 in a locked position, with a button stopper preventing depression of the push button, according to embodiments of the invention.
Figure 13B:
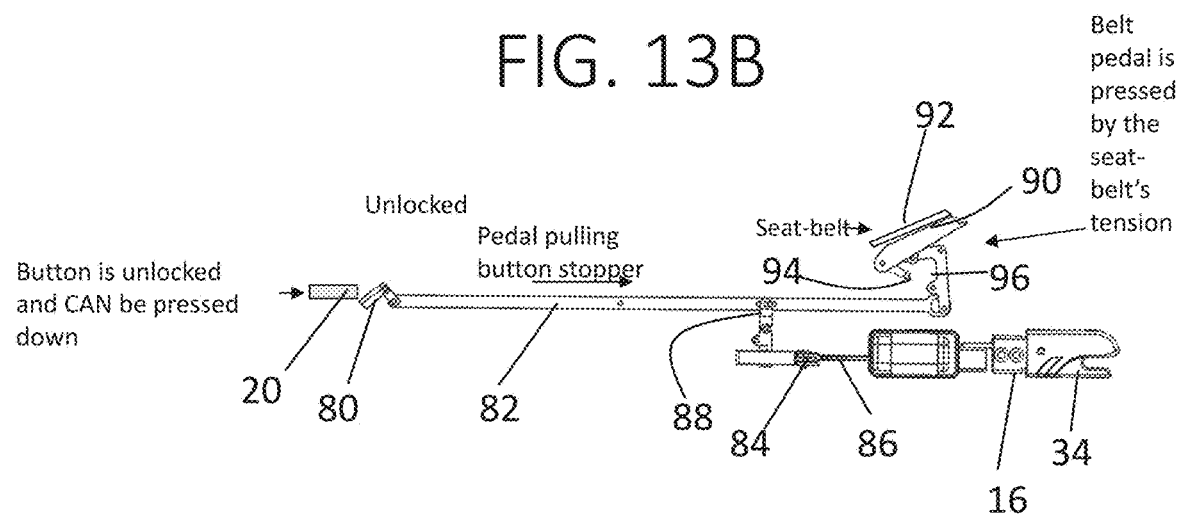
FIG. 13B is a schematic depiction of the push button release mechanism of FIG. 13A with the button stopper mechanically retracted, allowing depression of the push button, according to embodiments of the invention.
Figure 14A:
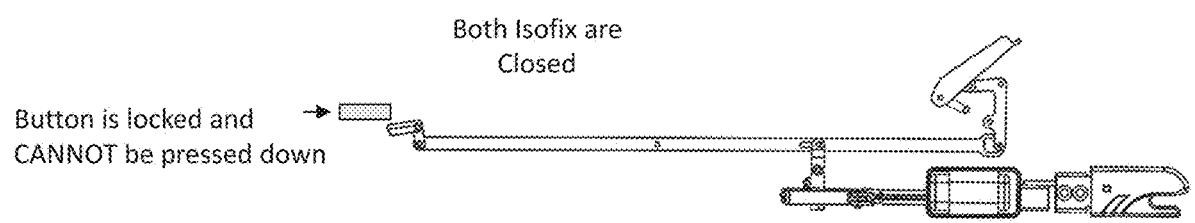
FIGS. 14A-14C are further schematic views of the push button release mechanism in the locked position.
Figure 14B:
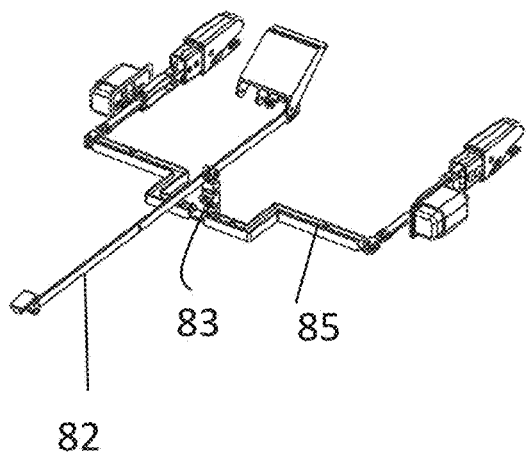
Figure 14C:
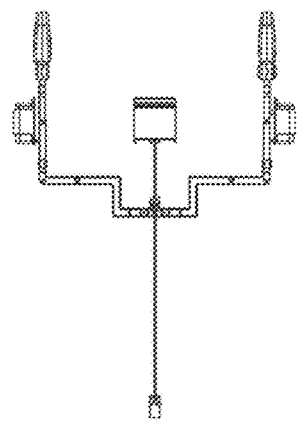

FIG. 13A depicts a state in which the push button release mechanism 20 is in a locked position, and cannot be pushed down. In this configuration, button stopper 80 is configured beneath push button 20, and mechanically prevents depression of the push button release mechanism 20. FIG. 13B depicts a state in which button stopper is mechanically retracted relative to its configuration in FIG. 13A, thereby allowing depression of push button release mechanism 20.

Rod 82 is mechanically connected to the button stopper 80, at a proximal end of the rod 82. At a distal end of the rod 82, the rod 82 is mechanically connected to both (1) a horizontal connector 85 between abutments 16 for Isofix connectors 34 and (2) a seat belt pedal 90. The Isofix connectors 34 are adapted to be attached to corresponding fittings on the vehicle seat, as discussed above. The seat belt pedal 90 is adapted to be located beneath seat belt 92, which is passed through seat belt guide 36 (not shown in FIGS. 13A-13B) and buckled to a buckle on the vehicle seat, as discussed above.

Figure 15A:
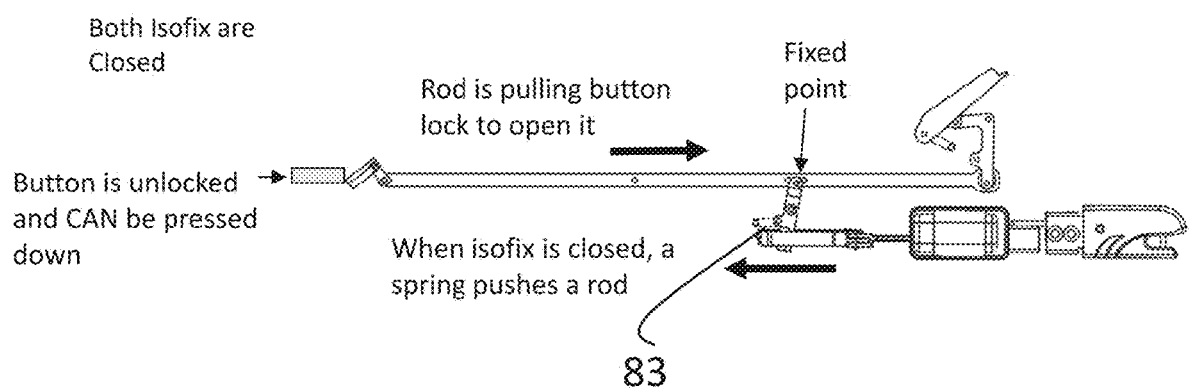
FIGS. 15A-15C are further schematic views of the push button release mechanism, depicting movement of the push button release mechanism into an unlocked position in which the button stopper does not prevent depression of the push button, according to embodiments of the invention.
Figure 15B:
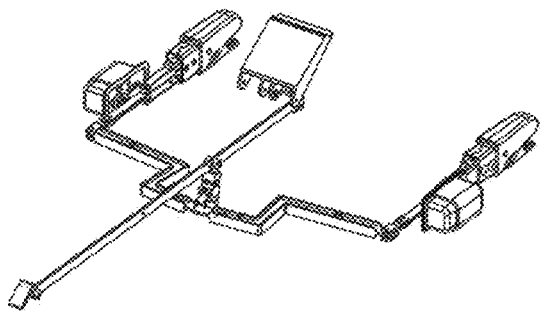
Figure 15C:
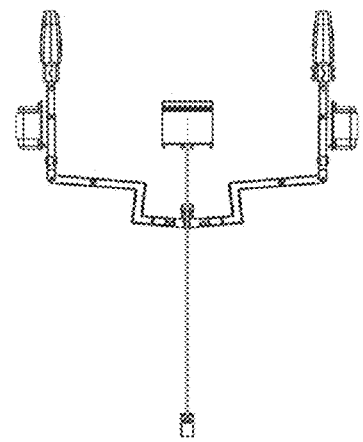

As depicted in FIGS. 13A, 13B, and 15A, the rod 82, and correspondingly the button stopper 80 attached thereto, may be retracted through either connection of the Isofix connectors 34 or buckling of the seat belt 92. With respect to connection of the Isofix connectors 34, each of the abutments 16 includes a spring 84 and a corresponding spring-loaded piston 86. A first pivot 88 is configured between each of the abutments 16 and the rod 82. The pivot 88 is fixedly connected to the rod 82, but has a pivot point 83 at the intersection of pivot 88 and horizontal connector 85. When the Isofix connectors are closed, springs 84 push spring-loaded pistons 86, to cause pistons 86 to move proximally. The proximal movement of pistons 86 causes pivot 88 to pivot in a forward direction, and thereby causes corresponding rearward movement of the rod 82.

With respect to buckling of the seat belt 92, belt pedal 90 is attached to rod 82 via a second pivot 96. Belt pedal 90 includes extension 94. When belt pedal 90 is depressed by the force of the buckled seat belt 92, extension 94 is driven into pivot 96. This causes second pivot 96 to pivot in a forward direction, and causes corresponding rearward movement of the rod.

In an advantageous embodiment, substantially identical rearward movement of the rod 82 is caused by either buckling the seat belt 92 or by attaching the Isofix connectors 34 to the corresponding fittings of the vehicle seat. Advantageously, the push button release mechanism is thus released in an identical way, regardless of the method employed to attach the car seat base to a vehicle seat.

As discussed above in connection with FIGS. 2-4, in the illustrated embodiment, the anti-rebound device 18 is released by depression of a push button release mechanism 20 following attachment of the car seat base 10 to the vehicle. In alternative embodiments, the anti-rebound device 18 is extended automatically upon attachment of either Isofix connectors 34 or a seat belt to the vehicle. In such embodiments, the rod 82 is itself connected to the release mechanism, rather than to a button stopper that prevents depression of a push button, so that movement of the rod itself releases the release mechanism.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

It is expected that during the life of a patent maturing from this application many types of sensors, many types of light emitting devices, and many types of push button release mechanisms will be developed and the scope of the terms sensor, light emitting device, and push button release mechanism is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for guiding installation of a car seat base and a corresponding car seat, comprising:
    a plurality of sensors mounted on the car seat base for detecting a progress of a user in a plurality of sequential installation steps required for installing the car seat base and the corresponding car seat on a vehicle seat;
    a plurality of light emitting elements arranged at various locations on the car seat base, each location corresponding to one of the plurality of installation steps;
    a processor adapted to execute code instructions for:
    in response to outputs a first light signal of at least one of the plurality of sensors, identifying completion of a current installation step of the plurality of installation steps; and
    instructing a suitable light emitting element from the plurality of light emitting elements to output a second light signal indicate a location corresponding to an installation step following the current installation step,
    wherein, upon detection of an error status by one of the sensors, one or more of the plurality of light emitting elements is configured to display an error light signal to instruct the user to rectify the error,
    wherein the error status comprises at least one of: (1) installation step not completed correctly or completed in the wrong sequence; (2) child not buckled; (3) one of the parts of the car seat base or car seat not properly connected; and (4) car seat no longer structurally safe due to accident impact.

2. The system of claim 1, wherein the car seat base further comprises a central light interface comprised of light emitting elements arranged in a pattern, each of the light emitting elements of the central light interface corresponding to one of the installation steps, wherein, for each of the installation steps, whenever a light emitting element from the plurality of light emitting elements indicates a location corresponding to an installation step.

3. The system of claim 1, wherein the car seat base further comprises a communication module configured to wirelessly deliver information to a mobile device about a status of each of the installation steps and/or an alert status, and further comprising code instructions embodied in a non-transitory medium stored on the mobile device, the code instructions configured, upon receipt of a status of completion of each installation step, to display a pictorial representation of a progress of installation of the car seat base and instructions for performing a subsequent step of the sequential installation steps.

4. The system of claim 1, wherein the car seat base further comprises a speaker for delivering audible messages regarding a status of each of the installation steps and/or an alert status.

5. The system of claim 1, wherein the plurality of sensors comprise sensors for detecting one or more of: (1) leg angle of a telescopic load leg; (2) pressure on the telescopic load leg; (3) extension of the telescopic load leg; (4) whether an Isofix connector of the base is engaged with a corresponding child safety seat attachment point of the vehicle; (5) whether a seat belt is passed through a seat belt guide; (6) whether an anti-rebound device is in a folded position or an extended position; (7) orientation of the car seat as front facing or rear facing; (8) whether a car seat belt buckle is engaged; (9) presence of a child in the car seat; (10) reclining angle of the car seat; (11) type of car seat connected to the base; (12) whether the car seat was subjected to substantial forces and is not suitable for usage or installation; and (13) whether a power source for the car seat base has sufficient power.

6. The system of claim 1, wherein the car seat base further comprises a frame, a load leg that is pivotable from a folded position beneath the frame to an extended position between the frame and a vehicle floor, and at least one handle or grip oriented on the frame to enable grasping of the frame, wherein, when the car seat base is grasped from the at least one handle or grip, the leg pivots into the extended position.

7. The system of claim 6, wherein the at least one handle or grip is configured at least one of (1) on an upper portion of the frame; (2) on a front portion of the frame; (3) in a rear portion of the frame; and (4) on two parallel side portions of the frame.

8. The system of claim 6, further comprising a locking mechanism for locking the leg into the extended position.

9. The system of claim 1, wherein the car seat base has a release mechanism rod mechanically connected to (1) a stopper preventing release of the release mechanism; (2) a belt pedal adapted to be located beneath a seat belt; and (3) two arms each having a connecting latch belt.

* * * * *